US010527963B2

(12) United States Patent
Kimura

(10) Patent No.: US 10,527,963 B2
(45) Date of Patent: Jan. 7, 2020

(54) OPTICAL SCANNING DEVICE AND IMAGE FORMING APPARATUS INCLUDING THE SAME

(71) Applicant: CANON KABUSHIKI KAISHA, Tokyo (JP)

(72) Inventor: Kazumi Kimura, Toda (JP)

(73) Assignee: Canon Kabushiki Kaisha, Tokyo (JP)

(*) Notice: Subject to any disclaimer, the term of this patent is extended or adjusted under 35 U.S.C. 154(b) by 2 days.

(21) Appl. No.: 15/682,351

(22) Filed: Aug. 21, 2017

(65) Prior Publication Data

US 2018/0059572 A1    Mar. 1, 2018

(30) Foreign Application Priority Data

Aug. 24, 2016 (JP) .................. 2016-163393
Dec. 9, 2016 (JP) .................. 2016-239809

(51) Int. Cl.
G02B 26/12 (2006.01)
G03G 15/043 (2006.01)
H04N 1/113 (2006.01)

(52) U.S. Cl.
CPC ....... G03G 15/0435 (2013.01); G02B 26/123 (2013.01); G02B 26/124 (2013.01); H04N 1/1135 (2013.01); H04N 2201/0094 (2013.01)

(58) Field of Classification Search
CPC .............. G03G 15/0435; G02B 26/124; G02B 26/123; H04N 1/1135; H04N 2201/0094
See application file for complete search history.

(56) References Cited

U.S. PATENT DOCUMENTS

2001/0001580 A1    5/2001  Rowe
2013/0016171 A1*   1/2013  Nakamura ............... B41J 2/473
                                                        347/118

FOREIGN PATENT DOCUMENTS

JP    S60-028619 A    2/1985
JP    60-200217 A  * 10/1985 ............ G02B 26/10
JP    60-200217 A  * 10/1985 ............ G02B 26/10
JP    S60-200217 A   10/1985
JP    2001-281580 A  10/2001
JP    2002-277779 A   9/2002
JP    2008-203347 A   9/2008

* cited by examiner

Primary Examiner — Yaovi M Ameh
(74) Attorney, Agent, or Firm — Canon U.S.A., Inc. I.P. Division

(57) ABSTRACT

An optical scanning device includes a deflector configured to deflect first and second beams to scan an effective area of a first scanned surface in a main scanning direction, and first and second imaging optical systems configured to guide the first and second beams deflected by the deflector to first and second areas, respectively, which are included in the effective area and different from each other in the main scanning direction. In the main scanning direction, the first area and the second area are asymmetric in width with respect to an optical axis.

19 Claims, 12 Drawing Sheets

OPTICAL SCANNING DEVICE AND IMAGE FORMING APPARATUS INCLUDING THE SAME

BACKGROUND OF THE INVENTION

Field of the Invention

The present invention relates to an optical scanning device suitable for an image forming apparatus, such as a laser beam printer and a multifunction printer.

Description of the Related Art

An example of a conventionally known optical scanning device for use in an image forming apparatus is the one that deflects a beam emitted from a light source using a deflector and guides the deflected beam to a scanned surface using an imaging optical system, to scan the scanned surface in a main scanning direction. Further, an example of a known scanning method of an optical scanning device is the one in which a printing area (an effective area) on a scanned surface is divided into two areas in a main scanning direction and the divided areas are scanned separately using two beams (a cascade scanning method).

Japanese Patent Application Laid-Open No. 2001-281580 discusses an image forming apparatus for scanning two printing areas on a common scanned surface in a separate manner using two optical scanning devices placed in parallel. Based on this configuration, an optical path length from a deflector to the scanned surface can be made shorter than an optical path length in a configuration in which a single optical scanning device scans the entire area of a printing area at the same scanning viewing angle. This configuration thus contributes to downsizing of the image forming apparatus.

In the image forming apparatus discussed in Japanese Patent Application Laid-Open No. 2001-281580, however, two optical scanning devices are provided. Thus, the number of components is large, and the entire apparatus is not sufficiently downsized. Further, with this configuration, if the position of the scanned surface is shifted in the optical axis directions, the incident positions (the printing positions) of two beams at the boundary between the two printing areas are greatly shifted in the main scanning direction. Thus, it becomes difficult to form an excellent image.

SUMMARY OF THE INVENTION

The present invention is directed to providing an optical scanning device capable of forming an excellent image even with a small-sized and simple configuration, and also providing an image forming apparatus including the same.

According to an aspect of the present invention, an optical scanning device includes a deflector configured to deflect first and second beams to scan an effective area of a first scanned surface in a main scanning direction, and first and second imaging optical systems configured to guide the first and second beams deflected by the deflector to first and second areas which are included in the effective area and different from each other in the main scanning direction, wherein in the first area, a width of a third area, in the first area, on a side distant from the second area with respect to a first optical axis of the first imaging optical system is longer than a width of a fourth area, in the first area, on a side close to the second area with respect to the first optical axis in the main scanning direction, and wherein in the second area, a width of a fifth area on a side distant from the first area with respect to a second optical axis of the second imaging optical system is longer than a width of a sixth area on a side close to the first area with respect the second optical axis in the main scanning direction.

Further features of the present invention will become apparent from the following description of exemplary embodiments with reference to the attached drawings.

DESCRIPTION OF THE EMBODIMENTS

Figure 1:
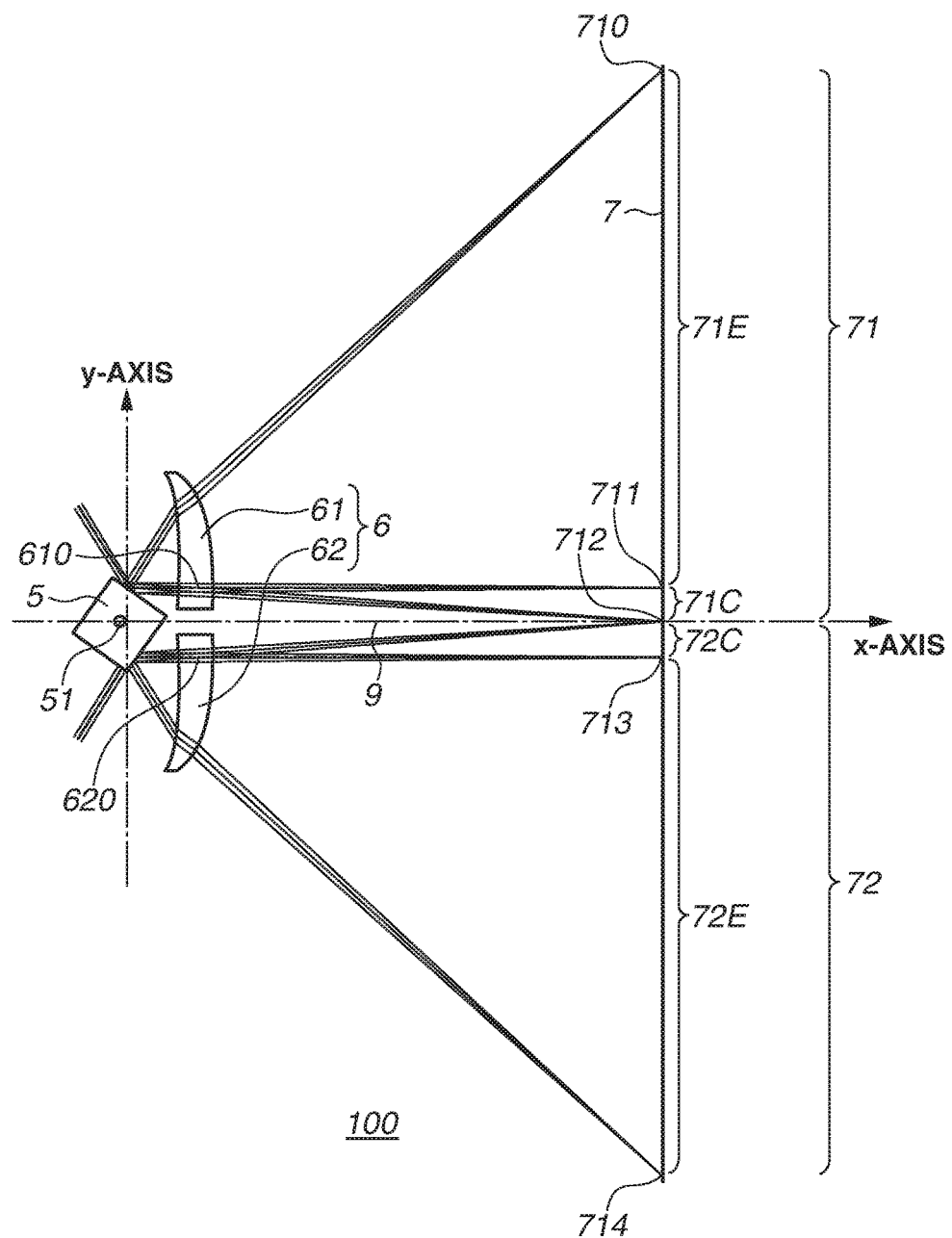
FIG. 1 is a schematic diagram of a main part of an optical scanning device according to a first exemplary embodiment of the present invention.

Desirable exemplary embodiments of the present invention will be described below with reference to the drawings. The drawings may be made in sizes different from the actual sizes for convenience. Further, in the drawings, similar members are designated by the same numerals, and are not redundantly described.

In the following description, a main scanning direction is a direction perpendicular to the rotational axis of a deflector and the optical axis direction of an optical system. A sub-scanning direction is a direction parallel to the rotational axis of the deflector. Further, a main scanning cross section is a cross section parallel to the optical axis direction and the main scanning direction (a cross section perpendicular to the sub-scanning direction). A sub-scanning cross section is a cross section parallel to the optical axis direction and the sub-scanning direction (a cross section perpendicular to the main scanning direction). That is, these directions and cross sections may be different in each optical system.

FIG. 1 is a schematic diagram of a main part of an optical scanning device 100 according to a first exemplary embodiment of the present invention. The optical scanning device 100 includes a common deflector 5, which deflects first and second beams to scan an effective area of a scanned surface (first scanned surface) 7 in the main scanning direction, and an imaging optical system 6, which guides the first and second beams deflected by the deflector 5 to the scanned surface 7.

In FIG. 1, an absolute coordinate system xyz is defined based on an x-axis passing through a center (center image height) 712 in the main scanning direction of the effective area on the scanned surface 7 and also through a rotational axis 51 of the deflector 5, a y-axis orthogonal to the x-axis and passing through a deflection point (a reflection point) on the deflector 5, and a z-axis orthogonal to the x-axis and the y-axis. The deflection point for defining the y-axis is the deflection point of the first beam proceeding to a printing position 711. In FIG. 1, for convenience of explanation, a single diagram illustrates a situation where the first beam is incident on an image height on the scanned surface 7 at one timing and also a situation where the second beam is incident on an image height on the scanned surface 7 at another timing.

The first and second beams are incident on the deflector 5 from different sides from each other with respect to a reference plane 9, which includes the rotational axis 51 and is perpendicular to the main scanning direction (a plane including the x-axis and perpendicular to the y-axis). Specifically, the first beam is incident on the deflector 5 from the positive side in the y-axis direction, and the second beam is incident on the deflector 5 from the negative side in the y-axis direction. Each of the first and second beams may be emitted from a different one of two light sources, or may be obtained by dividing a beam emitted from a single common light source.

The imaging optical system 6 includes first and second imaging optical systems 61 and 62, which are placed on different sides from each other with respect to the reference plane 9. The first and second imaging optical systems 61 and 62 guide the first and second beams to first and second areas 71 and 72, respectively, which are included in the effective area and different from each other in the main scanning direction. Each of the first and second imaging optical systems 61 and 62 according to the present exemplary embodiment includes a single imaging element (first and second imaging elements), but may include a plurality of imaging elements where necessary.

The first area 71 is an area in the effective area and on a side where the first beam is incident on the deflector 5 with respect to the reference plane 9, i.e., a printing area from a most off-axis image height 710 on the positive side in the y-axis direction to the center image height 712. Further, the second area 72 is an area in the effective area and on a side where the second beam is incident on the deflector 5 with respect to the reference plane 9, i.e., a printing area from the center image height 712 to a most off-axis image height 714 on the negative side in the y-axis direction.

As described above, the optical scanning device 100 according to the present exemplary embodiment employs a cascade scanning method for scanning, using the first and second beams, printing areas on the common scanned surface 7 and different from each other in the main scanning direction. The above-described optical scanning device 100 employs a configuration in which the common deflector 5 scans the first and second beams. Thus, it is possible to achieve the downsizing of the entire apparatus by reducing the number of components as compared with the configuration discussed in the publication of Japanese Patent Application Laid-Open No. 2001-281580.

The "printing areas different from each other" refer to "printing areas at least parts of which are different from each other". That is, the first and second areas 71 and 72 may not be completely separate as illustrated in FIG. 1. For example, taking into account the assembly tolerance of each member, the first and second areas 71 and 72 may be configured to partially overlap each other beyond the center image height 712.

The first area 71 is considered separately as two areas, namely areas 71E and 71C (third and fourth areas respectively), with respect to a first optical axis 610 of the first imaging optical system 61. The area 71E is an area (an outside printing area) on a side distant from the second area 72 with respect to an intersection 711 of the first optical axis 610 and the scanned surface 7, i.e., the area (from the most off-axis image height 710 to the intersection 711) on a side distant from the reference plane 9. Further, the area 71C is an area (an inside printing area) on a side close to the second area 72 with respect to the intersection 711, i.e., the area (from the intersection 711 to the center image height 712) on a side of the reference plane 9. The width of the area 71E is thus longer than the width of the area 71C in the main scanning direction, as illustrated in FIG. 1.

Similarly, the second area 72 is considered separately as two areas, namely areas 72E and 72C (fifth and sixth areas respectively), with respect to a second optical axis 620 of the second imaging optical system 62. The area 72E is an area (an outside printing area) on a side distant from the first area 71 with respect to an intersection 713 (an on-axis image height) of the second optical axis 620 and the scanned surface 7, i.e., the area (from the intersection 713 to the most off-axis image height 714) on a side distant from the reference plane 9. Further, the area 72C is an area (an inside printing area) on a side close to the first area 71 with respect to the intersection 713, i.e., the area (from the center image height 712 to the intersection 713) on a side of the reference plane 9. The width of the area 72E is thus longer than the width of the area 72C in the main scanning direction, as illustrated in FIG. 1.

That is, in each of the first and second areas 71 and 72, when the width of the areas on the sides close to the other area (the areas on the side of the reference plane 9) is Yc [mm], and the width of the areas on the sides distant from the other area (the areas distant from the reference plane 9) is Ye [mm], the optical scanning device 100 satisfies the following conditional expression (1). The values of Yc and Ye, however, may be different between the first and second areas 71 and 72.

$$Yc < Ye \qquad (1)$$

Conditional expression (1) is satisfied, whereby the optical scanning device 100 can be configured such that the first and second beams asymmetrically scan printing areas on both sides with respect to the optical axis of each of the first and second imaging optical systems 61 and 62. This can make the angles between beams incident on the center image height 712, which is the boundary between the first and second areas 71 and 72, and a perpendicular (the x-axis) to the scanned surface 7 sufficiently small. Thus, if the position of the scanned surface 7 is shifted in the optical axis directions, it is possible to reduce the shifts in the incident positions of the first and second beams at the boundary between the first and second areas 71 and 72. Thus, an excellent image can be formed.

Figure 12:
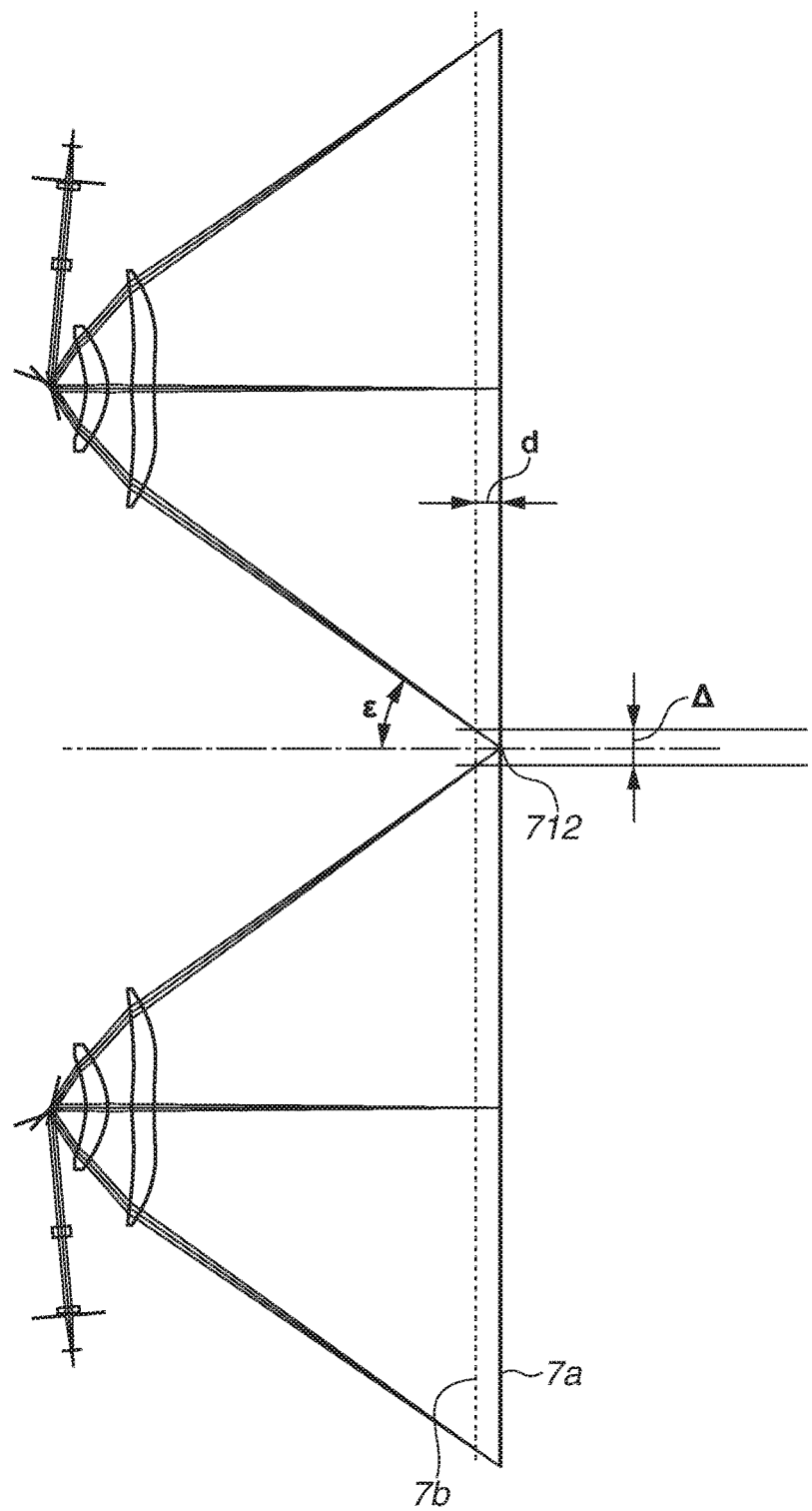
FIG. 12 is a schematic diagram of a main part of an optical scanning device according to a conventional example.

With reference to FIG. 12, the effects of the optical scanning device 100 according to the present exemplary embodiment are described. FIG. 12 illustrates a configuration for, similarly to the configuration discussed in Japanese Patent Application Laid-Open No. 2001-281580, scanning two printing areas on a common scanned surface in a divided manner using two optical scanning devices placed in parallel. Unlike the optical scanning device 100 according to the present exemplary embodiment, each optical scanning device illustrated in FIG. 12 employs a configuration in which the widths of printing areas on both sides with respect to the optical axis of an imaging optical system are equal to each other.

As illustrated in FIG. 12, if a positional shift does not occur to the scanned surface, i.e., if the scanned surface is placed at the position of a solid line 7a, most off-axis beams on a side of a center image height from the two optical scanning devices are incident on a center image height 712, which is the boundary between the two printing areas. If, however, the scanned surface is shifted to the position of a dashed line 7b, the most off-axis beams from the two optical scanning devices are incident on positions shifted from the center image height 712.

As an example, the following case is considered: the scanned surface is a photosensitive surface of a photosensitive drum, and the rotational axis of the photosensitive drum becomes eccentric with respect to the central axis by 0.05 mm in the optical axis directions. In this case, every time the photosensitive drum rotates once, the distance between the scanned surface and each optical scanning device fluctuates by d=±0.05 mm. For example, if the angle between each most off-axis beam on the side of the center image height and a perpendicular to the scanned surface is ε=35°, the relative shift in the incident position of the most off-axis beam is Δ=d×tan ε×2=±0.05×tan 35°×2=±0.07 mm.

If a positional shift thus occurs to the scanned surface, the incident positions of beams at the boundary between the two printing areas are greatly shifted, and it is difficult to form an excellent image. Then, the shift in the incident position of each beam at the boundary between the two printing areas increases in proportion to the incident angle of the beam and therefore is conspicuous particularly in a configuration in which the scanning viewing angle (the deflection viewing angle) is made large to shorten the optical path length.

As described above, the optical scanning device 100 according to the present exemplary embodiment satisfies conditional expression (1), and accordingly sets the scanning viewing angle to each of the first and second areas 71 and 72 on the same side (inside) as the other area with respect to the optical axis to be smaller than the scanning viewing angle on the opposite side (outside) of the other area. That is, the scanning viewing angle to the area 71C is made smaller than the scanning viewing angle to the area 71E, and the scanning viewing angle to the area 72C is made smaller than the scanning viewing angle to the area 72E. This can make the incident angle ε of each of the beams to the areas 71C and 72C small. Thus, it is possible to reduce the shift in the incident position Δ=d×tan ε×2.

It is desirable that when the radius of the circumcircle of the deflector 5 in the main scanning cross section is Rd [mm], the optical scanning device 100 according to the present exemplary embodiment should satisfy the following conditional expression (2).

$$Yc < Rd < Ye \qquad (2)$$

In a configuration in which, as in the optical scanning device 100 according to the exemplary embodiment, the principal ray of a beam perpendicularly incident on a scanned surface coincides with the optical axis of an imaging optical system, if the configuration falls below the lower limit of conditional expression (2), there is a possibility that comatic aberration occurs. In such a case, a method for correcting the comatic aberration by the imaging optical system including a plurality of imaging elements can be used, but is not desirable because the number of components increases. Further, if the configuration exceeds conditional expression (2), the deflector 5 becomes too large, and it is difficult to downsize the entire apparatus.

Next, the optical arrangement of the optical scanning device 100 according to the present exemplary embodiment is described in detail.

Figure 2A:
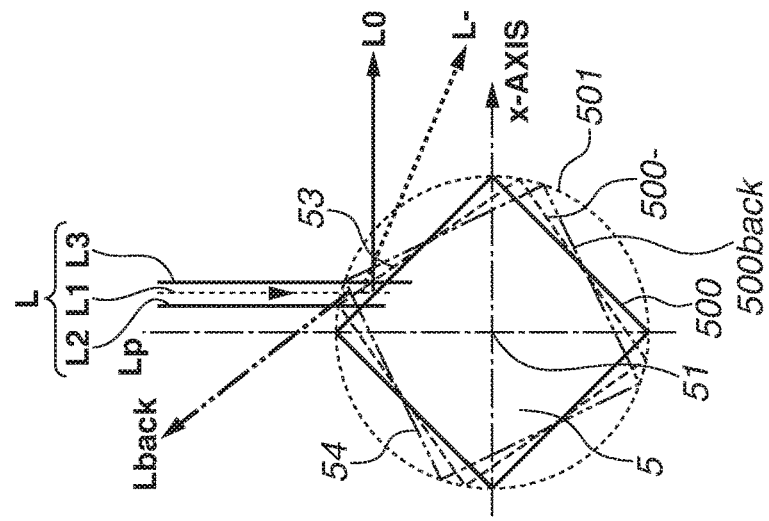
FIG. 2A is a diagram illustrating an action of the optical scanning device according to the first exemplary embodiment.

FIG. 2A is a diagram illustrating the states where the deflector 5 rotates about the rotational axis 51 and the situation where a principal ray L1 of a beam L, which is incident on the deflector 5, is deflected in each state, in the present exemplary embodiment. In FIG. 2A, for ease of description, a case is assumed where the beam L is incident on the deflector 5 from a direction parallel to a reference line Lp, which passes through the rotational axis 51 and is perpendicular to the x-axis.

In FIG. 2A, rays L0, L+, and L− indicate the principal ray L1 deflected in a case where the deflector 5 is in a first state 500 (a solid line), a case where the deflector 5 is in a second state 500+ (a one-dot chain line), and a case where the deflector 5 is in a third state 500− (a dashed line), respectively. The ray L0 proceeds to an on-axis image height in an effective area, and the rays L+ and L− proceed to most off-axis image heights in the effective area. Marginal rays L2 and L3 of the beam L after being deflected by the deflector 5 are omitted.

When the distance in the optical axis direction between the incident position of the principal ray L1 on the deflector 5 and the rotational axis 51 (the reference line Lp) when the principal ray L1 is deflected in a direction parallel to the x-axis (in the first state 500) is Lx [mm], the configuration in FIG. 2A satisfies the following conditional expression (3).

$$-Rd/2 \leq Lx \leq Rd/2 \qquad (3)$$

Conditional expression (3) is satisfied, whereby the incident position (the position of the deflection point) of the principal ray L1 on the deflector 5 comes close to the reference line Lp, and the ray L− comes close to the ray L0. Thus, an angle ω− between the rays L0 and L− is sufficiently smaller than an angle ω+ between the rays L0 and L+. In other words, a scanning viewing angle ω− on a side of the x-axis with respect to the optical axis of the imaging optical system 6 is sufficiently smaller than a scanning viewing angle ω+ on a side distant from the x-axis. Thus, it is desirable that the optical scanning device 100 according to the present exemplary embodiment should satisfy conditional expression (3).

Figure 2B:
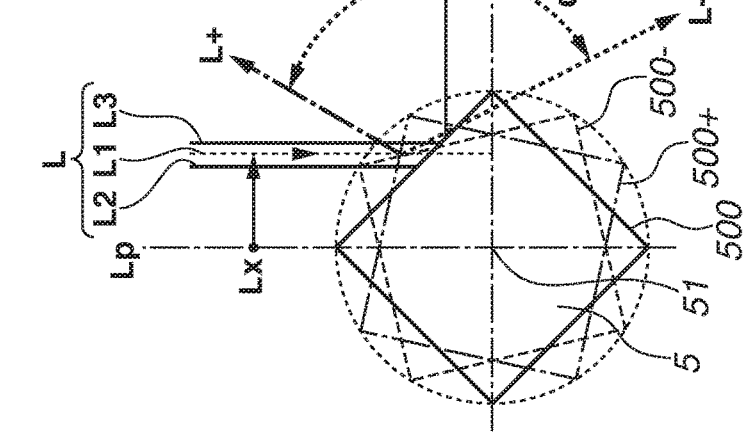
FIG. 2B is a diagram illustrating an action of an optical scanning device according to a comparative example.

FIG. 2B illustrates the states where the deflector 5 rotates and the situation where the principal ray L1, which is incident on the deflector 5, is deflected in each state, in a comparative example. The configuration in FIG. 2B is different from the configuration in FIG. 2A in that the configuration in FIG. 2B does not satisfy the above conditional expressions (1) and (3). Specifically, the configuration in FIG. 2B is such that the scanning viewing angles ω+ and ω− are equal to each other, i.e., printing areas are scanned symmetrically with respect to the optical axis. Thus, the configuration in FIG. 2B does not satisfy conditional expression (1), and cannot reduce the influence of the positional shift in a scanned surface.

Further, in the configuration in FIG. 2B, the principal ray L1 is made incident toward the intersection of a deflection surface of the deflector 5 in the second state 500+ and a deflection surface of the deflector 5 in the third state 500−. Consequently, the marginal ray L2 of the beam L is made incident further on the positive side in the x-axis direction than the edge of the deflection surface in the third state 500− so that the beam L is not eclipsed by the deflection surface of the deflector 5. In such a case, considering various tolerances, the value of Lx is about 0.55 Rd to 0.60 Rd. Thus, the configuration in FIG. 2B does not satisfy the above conditional expression (3).

Figure 2C:
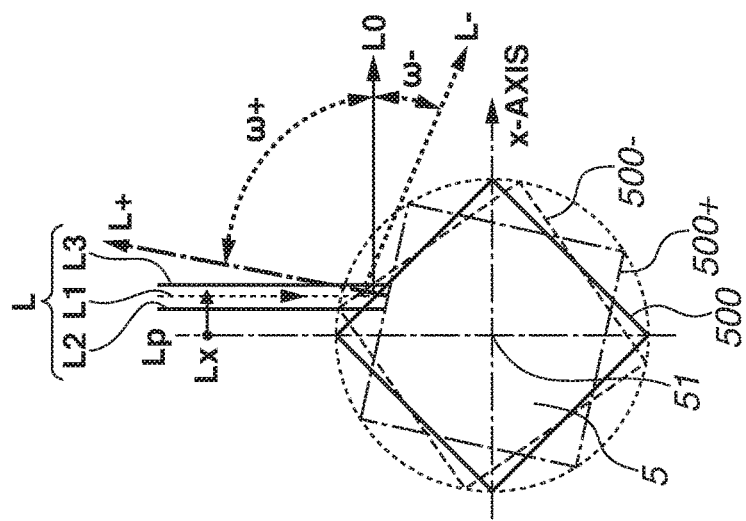
FIG. 2C is a diagram illustrating an action of the optical scanning device according to the first exemplary embodiment.

FIG. 2C illustrates a fourth state 500back (a two-dot chain line) instead of the second state 500+ of the deflector 5 in FIG. 2A. If the deflector 5 rotates clockwise and changes in the order of the first state 500, the third state 500−, and the fourth state 500back, the principal ray L1 deflected by the deflector 5 changes in the order of the ray L0, the ray L−, and a ray Lback. As illustrated in FIG. 2C, the directions in which the rays L− and Lback proceed are greatly different from each other. This is because when the deflector 5 rotates clockwise from the third state 500−, the beam L starts being gradually eclipsed by a deflection surface 53 from a side of the marginal ray L2. Then, when the deflector 5 enters the fourth state 500back, the beam L is incident on a deflection surface 54, which is adjacent to the deflection surface 53.

An imaging optical system is not placed in the direction in which the ray Lback proceeds. Thus, in the fourth state 500back, the ray Lback does not proceed to the scanned surface. That is, for a while after the ray L− is incident on the scanned surface, the beam L is not incident on the scanned surface. Using this fact, it is possible to perform time division scanning for sequentially scanning, using a plurality of beams, different areas on the scanned surface at different timings.

For example, a case is considered where two beams are made incident from both sides with respect to the x-axis on two deflection surfaces opposed to each other in the deflector 5. In this case, the deflector 5 changes in the order of the second state 500+, the first state 500, and the third state 500− in FIG. 2A, whereby one of the beams can scan one side of the scanned surface with respect to the x-axis. Then, until the deflector 5 further rotates and changes from the fourth state 500back to the second state 500+, the one of the beams does not proceed to the scanned surface. Thus, the other beam can scan the other side of the scanned surface with respect to the x-axis.

In this case, a beam emitted from a single light source may be divided into a plurality of beams, and time division scanning may be performed using the plurality of beams. Further, the optical scanning device 100 may be configured such that time division scanning is performed on another scanned surface using a beam deflected until the deflector 5 changes from the fourth state 500back to the second state 500+. Time division scanning is thus performed, whereby it is possible to form an image different in each of the printing areas on scanned surfaces.

It is desirable that the optical scanning device 100 should employ a configuration in which, as illustrated in FIG. 1, the first and second beams are incident on the deflector 5 at angles to the y-axis (from directions not perpendicular to the reference plane 9). If the first and second beams are incident on the deflector 5 from directions parallel to the y-axis (perpendicular to the reference plane 9), there is a possibility that off-axis beams are eclipsed by the deflection surfaces when time division scanning is performed, and not all printing areas can be scanned.

Based on the above, the optical scanning device 100 according to the present exemplary embodiment can form an excellent image even with a small-sized and simple configuration by reducing the shifts in the incident positions of beams at the boundary between two printing areas when a cascade scanning method is employed.

Figure 3:
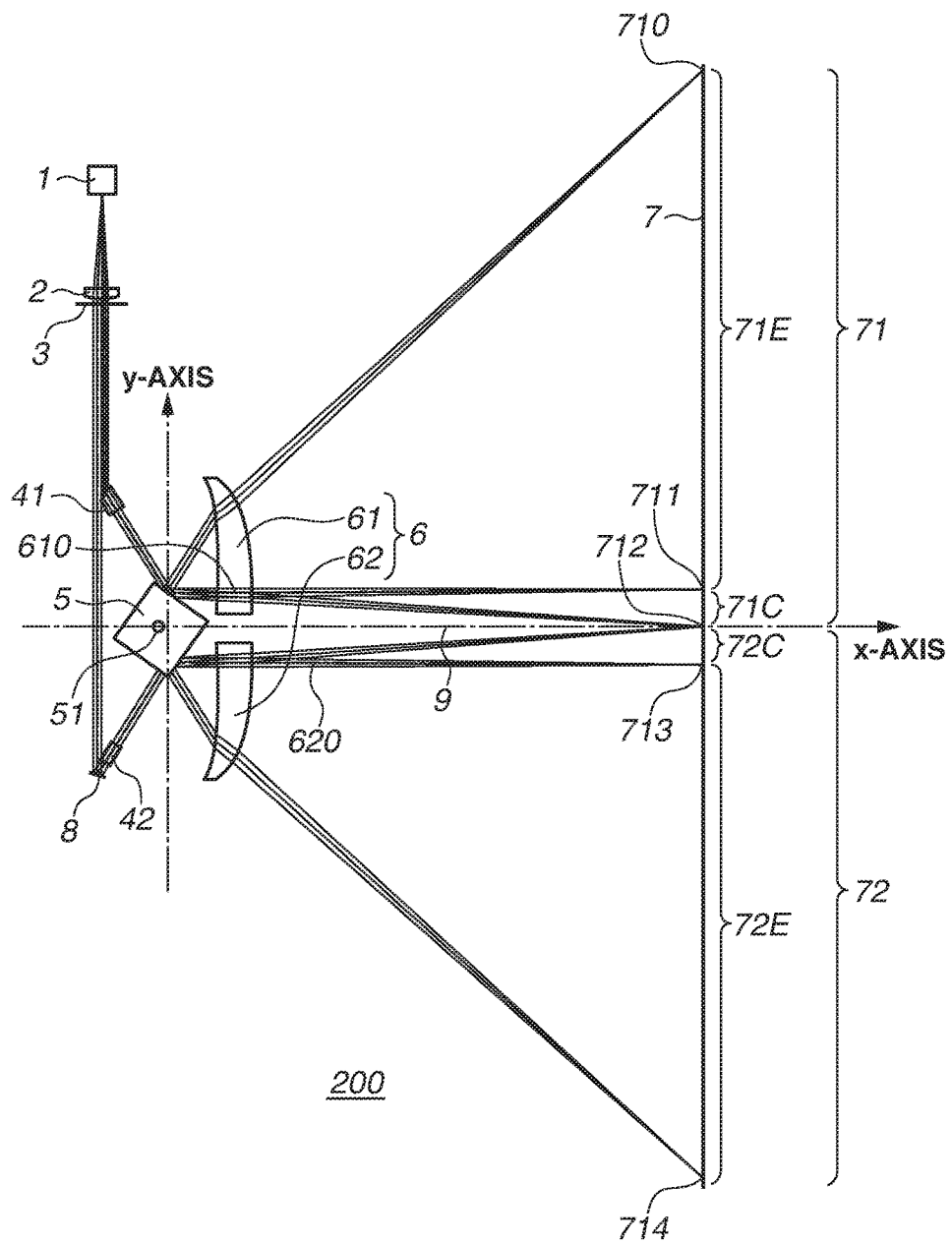
FIG. 3 is a schematic diagram of a main part of an optical scanning device according to a second exemplary embodiment of the present invention.

FIG. 3 is a schematic diagram of a main part of an optical scanning device 200 according to a second exemplary embodiment of the present invention. In the optical scanning device 200 according to the present exemplary embodiment, components equivalent to those of the optical scanning device 100 according to the first exemplary embodiment are not described.

The optical scanning device 200 according to the present exemplary embodiment is a device including a separation element 41, a deflector 5, and an imaging optical system 6, and for scanning an effective area of a scanned surface 7 in the main scanning direction. The separation element 41 is an optical element for separating first and second beams emitted from a common light source 1 from each other. As illustrated in FIG. 3, between the beams emitted from the common light source 1, the first beam is incident on the separation element 41, and the second beam is incident on a reflection element 8 not through the separation element 41. The separation element 41 can separate the optical paths of the first and second beams by changing the moving direction of the first beam in the main scanning cross section (in an xy cross section).

The first and second beams separated by the separation element 41 are incident on deflection surfaces different from each other in the deflector 5, from different sides from each other with respect to a reference plane 9, which includes a rotational axis 51 and is perpendicular to the main scanning direction (a plane including the x-axis and perpendicular to the y-axis). Specifically, the first beam is incident on a first deflection surface of the deflector 5 from the positive side in the y-axis direction, and the second beam is incident on a third deflection surface of the deflector 5 from the negative side in the y-axis direction. That is, the positive side corresponds to a side of the first beam, and the negative side corresponds to the a side of the second beam.

As illustrated in FIG. 3, if a first area 71 is divided into two areas with respect to an intersection 711 of a first optical axis 610 of a first imaging optical system 61 and the scanned surface 7, a most-off-axis-side area 71E is longer than a center-side area 71C. Similarly, if a second area 72 is divided into two areas with respect to an intersection 713 of a second optical axis 620 of a second imaging optical system 62 and the scanned surface 7, a most-off-axis-side area 72E is longer than a center-side area 72C.

Then, the deflector 5 according to the present exemplary embodiment scans the first and second areas 71 and 72 at different timings from each other. Specifically, the deflector 5 deflects the first and second beams on the first and third deflection surfaces at different timings from each other. Accordingly, time division scanning is performed on each of the first and second areas 71 and 72. Based on this configuration, it is possible to separately scan each of the first and second areas 71 and 72 without using a plurality of light sources. Thus, it is possible to form an image different in each of the areas.

As described above, the optical scanning device 200 according to the present exemplary embodiment employs a cascade scanning method for scanning, using the first and second beams, printing areas which are on the common scanned surface 7 and different from each other in the main scanning direction. In this case, the optical scanning device 200 employs a configuration in which the common deflector 5 scans the first and second beams emitted from the common light source 1. Thus, it is possible to achieve the downsizing of the entire apparatus by reducing the number of components as compared with the configuration discussed in Japanese Patent Application Laid-Open No. 2001-281580.

Next, a description is given of the situation where the first and second beams are deflected by the deflector 5.

FIGS. 4A, 4B, 5A, and 5B are cross-sectional views of main scanning, each illustrating the states where the deflector 5 rotates about the rotational axis 51 and the situation where principal rays LD1 and LD2 of the first and second beams incident on the deflector 5 are deflected in each state. In FIGS. 4A, 4B, 5A, and 5B, a reference line Lp indicates a straight line passing through the rotational axis 51 and perpendicular to the x-axis (parallel to the y-axis). Further, each of additional lines x1 to x4 is a straight line parallel to the reference plane 9 illustrated in FIG. 3 (a straight line parallel to the x-axis). Each of the following angles between lines concerned and the x-axis and the additional lines x1 to x4 corresponds to the angle to the reference plane 9 in the main scanning cross section.

In FIGS. 4A, 4B, 5A, and 5B, the marginal rays of the first and second beams are omitted. Further, in FIGS. 4A, 4B, 5A, and 5B, a case is assumed where the principal rays LD1 and LD2 are incident (incident in deflection surfaces) on the deflector 5 from directions parallel to a plane perpendicular to the rotational axis 51 (an xy plane). However, where necessary, the optical scanning device 200 may be configured such that the principal rays LD1 and LD2 are incident (obliquely incident) on the deflector 5 from directions oblique to the xy plane. In this case, FIGS. 4A, 4B, 5A, and 5B illustrate the projections of the principal rays LD1 and LD2 onto the xy plane.

Figure 4A:
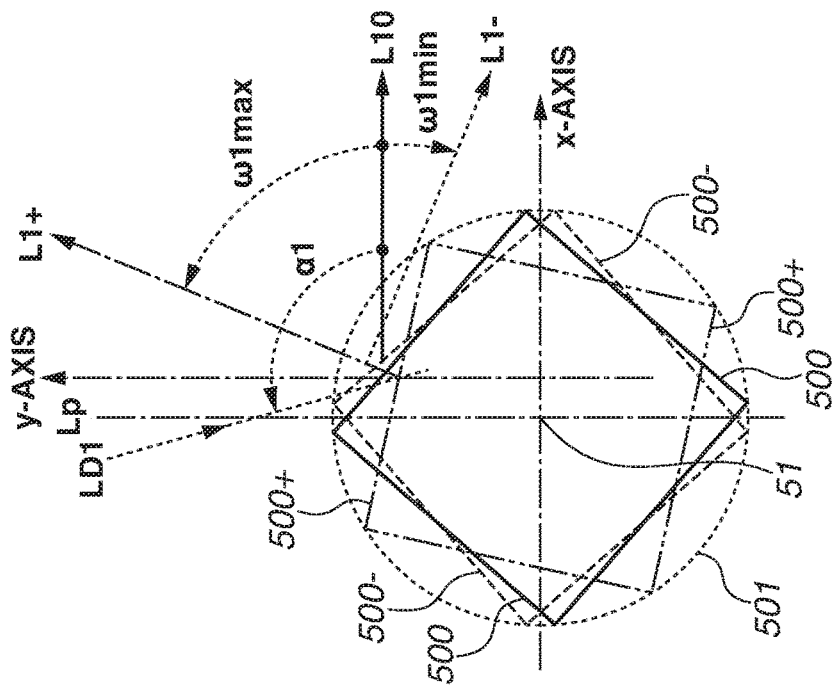
FIGS. 4A and 4B are diagrams illustrating situations where a first beam is deflected by a deflector.

In FIG. 4A, when the angle between a normal L1$v$ to a first deflection surface 52 and the x-axis is $\theta1$, the principal ray LD1 deflected by the first deflection surface 52 is a ray L$\theta1$, and the angle between the additional line x2, which passes through the intersection of the principal ray LD1 and the ray L$\theta1$, and the ray L$\theta1$ is $\omega1$. Further, the intersection of a circumcircle 501 of the deflector 5 and the principal ray LD1 (the incident position of the principal ray LD1 on the circumcircle 501) is P1$i$, and the angle between a straight line L1$i$, which connects the intersection P1$i$ and the center of the circumcircle 501 (the rotational axis 51), and the x-axis is $\rho1$. Further, the angle between the additional line x1, which passes through the intersection P1$i$, and the principal ray LD1 is $\alpha1$.

When the number of deflection surfaces of the deflector 5 is N, the angle between two straight lines connecting the rotational axis 51 and both end portions of the first deflection surface 52 is represented as $2\times\omega0=360°/N$. The angle $2\times\omega0$ indicates a rotation angle corresponding to the range where scanning can be performed using the first deflection surface 52 (the half value of the scanning viewing angle of the first deflection surface 52). Since N=4 in FIGS. 4A and 4B, $2\times\omega0=90°$. Further, $\omega0=180°/N=45°$.

Figure 4B:
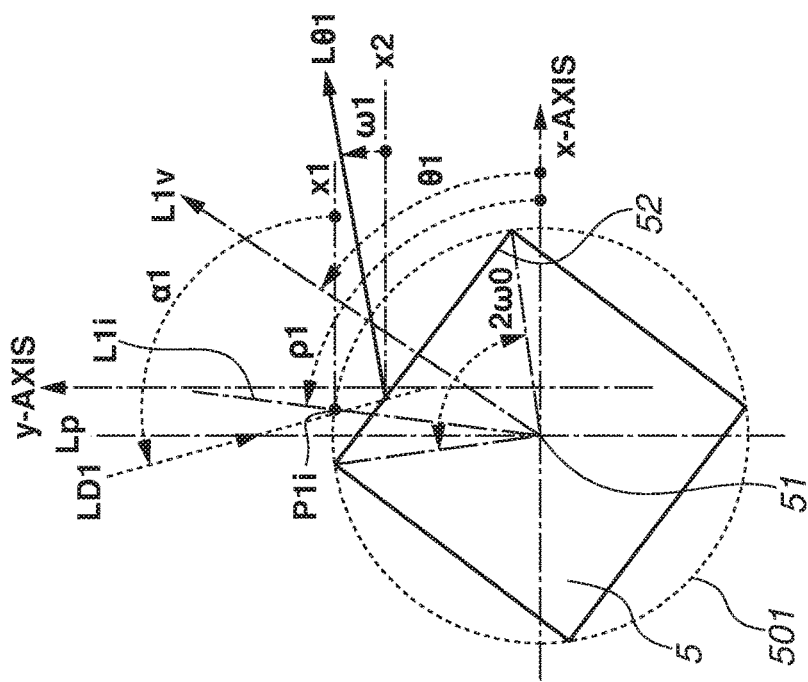

In FIG. 4B, rays L10, L1+, and L1− indicate the principal ray LD1 deflected in a case where the deflector 5 is in a first state 500 (a solid line), a case where the deflector 5 is in a second state 500+ (a two-dot chain line), and a case where the deflector 5 is in a third state 500− (a dashed line), respectively. The ray L10 proceeds in a direction parallel to the x-axis and proceeds to a printing position 711 in the first area 71 illustrated in FIG. 3 (the intersection of the first area 71 and the first optical axis 610). The rays L1+ and L1− proceed to a most off-axis image height 710 on the positive side and a center image height 712, respectively. Further, the angle between the rays L1+ and L10 (the viewing angle of the ray L1+) is $\omega1_{max}$, and the angle between the rays L1− and L10 (the viewing angle of the ray L1−) is $\omega1_{min}$.

If the deflector 5 rotates counterclockwise and changes in the order of the third state 500−, the first state 500, and the second state 500+, the principal ray LD1 deflected by the deflector 5 changes in the order of the rays L1−, L10, and L1+. That is, the principal ray LD1 scans the scanned surface 7 in the order of the center image height 712, the printing position 711, and the most off-axis image height 710 on the positive side. If the deflector 5 rotates clockwise, the above orders are reversed.

Figure 5B:
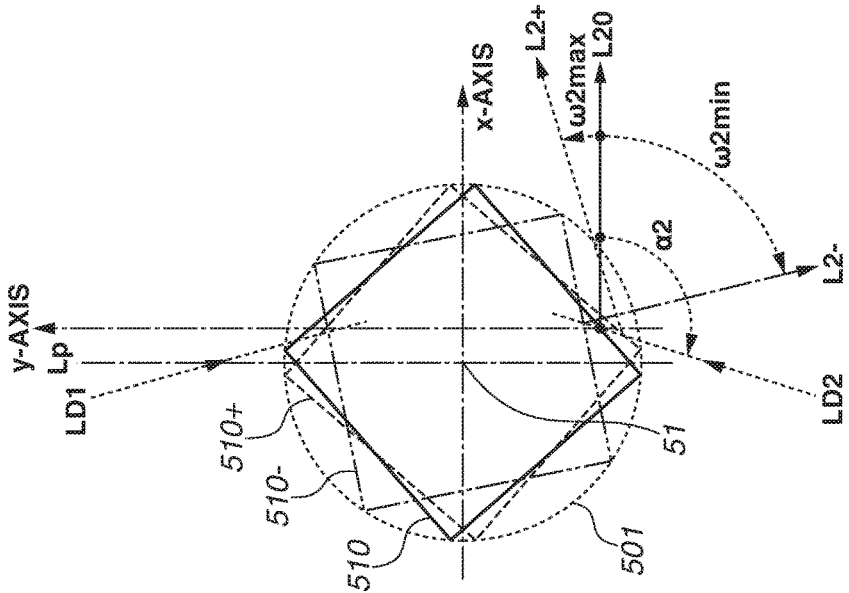
FIGS. 5A and 5B are diagrams illustrating situations where a second beam is deflected by the deflector.
Figure 5A:
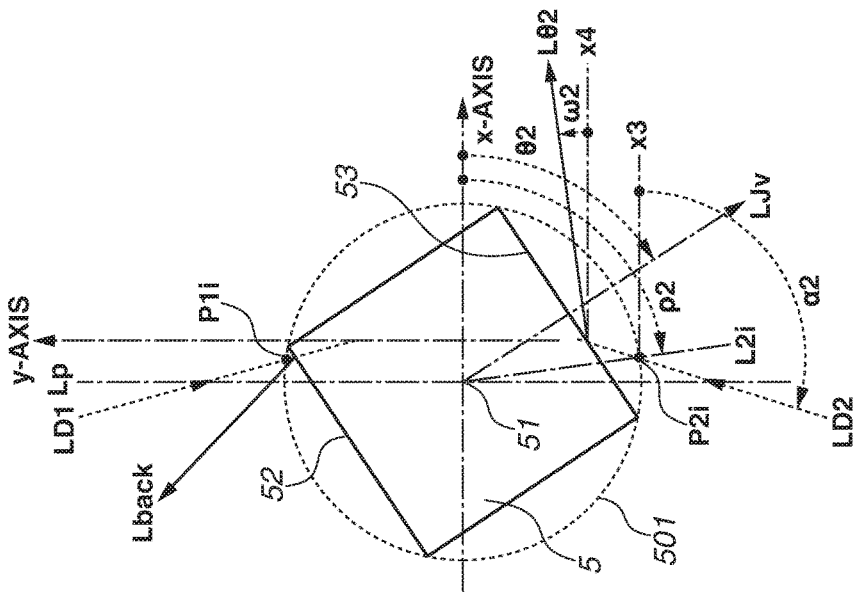

In FIG. 5A, when the angle between a normal LJ$v$ to a J-th deflection surface 53 and the x-axis is $\theta2$, the principal ray LD2 deflected by the J-th deflection surface 53 is a ray L$\theta2$, and the angle between the additional line x4, which passes through the intersection of the principal ray LD2 and the ray L$\theta2$, and the ray L$\theta2$ is $\omega2$. Further, the intersection of the circumcircle 501 of the deflector 5 and the principal ray LD2 is an incident position P2$i$ of the principal ray LD2, and the angle between a straight line L2$i$, which connects the incident position P2$i$ and the center of the circumcircle 501, and the x-axis is $\rho2$. Further, the angle between the additional line x3, which passes through the incident position P2$i$, and the principal ray LD2 is $\alpha2$.

The J-th deflection surface 53, on which the principal ray LD2 is incident, is the J-th deflection surface counted clockwise from the first deflection surface 52 when the first deflection surface 52 is the first deflection surface. J is an integer satisfying $2 \leq J \leq N$, and J=3 in FIG. 5. Further, the half value of the scanning viewing angle of the J-th deflection surface 53 is $2\times\omega0=90°$, similarly to the first deflection surface 52.

In FIG. 5B, rays L20, L2+, and L2− indicate the principal ray LD2 deflected in a case where the deflector 5 is in a first state 510 (a solid line), a case where the deflector 5 is in a second state 510+ (a dashed line), and a case where the deflector 5 is in a third state 510− (a two-dot chain line). The ray L20 proceeds in a direction parallel to the x-axis and proceeds to a printing position 713 in the second area 72 illustrated in FIG. 3 (the intersection of the second area 72 and the second optical axis 620). The rays L2+ and L2− proceed to the center image height 712 and a most off-axis image height 714 on the negative side, respectively. Further, the angle between the rays L2+ and L20 (the viewing angle of the ray L2+) is $\omega2_{max}$, and the angle between the rays L2− and L20 (the viewing angle of the ray L2−) is $\omega2_{min}$.

If the deflector 5 rotates counterclockwise and changes in the order of the third state 510−, the first state 510, and the second state 510+, the principal ray LD2 deflected by the deflector 5 changes in the order of the rays L2−, L20, and L2+. That is, the principal ray LD2 scans the scanned surface 7 in the order of the most off-axis image height 714 on the negative side, the printing position 713, and the center image height 712. If the deflector 5 rotates clockwise, the above orders are reversed.

As illustrated in FIG. 5A, at the timing when the principal ray LD2 is deflected by the J-th deflection surface 53 and incident as the ray L$\theta2$ on the scanned surface 7, the principal ray LD1 is deflected by the first deflection surface 52 and proceeds as a ray Lback in a direction away from the scanned surface 7. That is, at the timing when the principal ray LD2 scans the scanned surface 7, the principal ray LD1 does not scan the scanned surface 7. At the timing when the principal ray LD1 scans the scanned surface 7, the principal ray LD2 does not scan the scanned surface 7. As described above, the deflector 5 is configured such that the first and second beams scan the scanned surface 7 at different timings from each other.

A description is given of conditions for the first and second beams to scan the scanned surface 7 at different timings from each other. In the following description, a configuration is considered in which when the first and second beams (the principal rays LD1 and LD2) are projected onto a plane perpendicular to the rotational axis 51 of the deflector 5, the first and second beams are incident on the deflector 5 from directions symmetrical to each other with respect to the reference plane 9. That is, a case is considered where the angles of the principal rays LD1 and LD2 are line-symmetric to each other with respect to the reference plane 9 such that $\alpha 1 = -\alpha 2$, $\rho 1 = -\rho 2$, $\omega 1_{max} = -\omega 2_{min}$, and $\omega 1_{min} = -\omega 2_{max}$. Further, the deflector 5 rotates counterclockwise and scans the scanned surface 7 toward the positive side in the y-direction.

(First Condition)

A first condition is that the principal ray LD1 deflected by the first deflection surface 52 can scan the range from $\omega 1_{min}$ to $\omega 1_{max}$, and the principal ray LD2 deflected by the J-th deflection surface 53 can scan the range from $\omega 2_{min}$ to $\omega 2_{max}$. The range from $\omega 1_{min}$ to $\omega 1_{max}$ corresponds to the first area 71, and the range from $\omega 2_{min}$ min to $\omega 2_{max}$ corresponds to the second area 72.

First, considering the relationship between the normal angle $\theta 1$ of the first deflection surface 52 and the angle $\rho 1$, which corresponds to the incident position P1i of the principal ray LD1 on the circumcircle 501 of the deflector 5, the following conditional expression (4) needs to be satisfied to satisfy the first condition:

$$\theta 1 - \omega 0 < \rho 1 < \theta 1 + \omega 0 \leftrightarrow$$

$$\rho 1 - \omega 0 < \theta 1 < \rho 1 + \omega 0 \quad (4).$$

The angle $\alpha 1$ when the principal ray LD1 is incident on the deflector 5 and the angle $\omega 1$ after the principal ray LD1 is deflected by the deflector 5 satisfy the following relationship.

$$\alpha 1 - \theta 1 = \theta 1 - \omega 1 \leftrightarrow$$

$$\omega 1 = 2\theta 1 - \alpha 1 \leftrightarrow$$

$$\theta 1 = (\omega 1 + \alpha 1)/2$$

Thus, conditional expression (4) can be transformed into the following conditional expression (5):

$$\rho 1 - \omega 0 < (\omega 1 + \alpha 1)/2 < \rho 1 + \omega 0 \leftrightarrow$$

$$(\rho 1 - \omega 0) \times 2 - \alpha 1 < \omega 1 < (\rho 1 + \omega 0) \times 2 - \alpha 1 \quad (5).$$

Conditional expression (5) can be divided into the following conditional expressions (6) and (7):

$$\alpha 1 > (\rho 1 - \omega 0) \times 2 - \omega 0 \quad (6),$$

and $$\alpha 1 < (\rho 1 + \omega 0) \times 2 - \omega 1 \quad (7)$$

Then, considering that the angle $\omega 1$ satisfies the following conditional expression (8), conditional expressions (6) and (7) can be transformed into the following conditional expressions (9) and (10):

$$\omega 1_{min} < \omega 1 < \omega 1_{max} \quad (8),$$

$$\alpha 1 > (\rho 1 - \omega 0) \times 2 - \omega 1_{min} \quad (9),$$

and $$\alpha 1 < (\rho 1 + \omega 0) \times 2 - \omega 1_{max} \quad (10).$$

Further, the angle $\alpha 1$ needs to satisfy the following conditional expression (11):

$$\alpha 1 > \omega 1_{max} \quad (11).$$

The above conditional expressions (9) to (11) indicate conditions for the angles $\rho 1$ and $\alpha 1$ in order that the principal ray LD1 deflected by the first deflection surface 52 scans the range from $\omega 1_{min}$ to $\omega 1_{max}$ (the first area 71).

Further, after the principal ray LD1 deflected by the first deflection surface 52 finishes scanning and by the time when the principal ray LD1 deflected by the next deflection surface starts scanning, the principal ray LD2 deflected by the J-th deflection surface 53 needs to finish scanning the center image height 712. In other words, when the principal ray LD1 is not incident on the first deflection surface 52, and starts being incident on the next deflection surface adjacent to the first deflection surface 52, i.e., when $\theta 1 = \rho 1 + \omega 0$, the following conditional expression (12) needs to be satisfied:

$$\omega 2 > \omega 2_{max} \leftrightarrow$$

$$2 \times \theta 2 - \alpha 2 > \omega 2_{max} \quad (12).$$

Conditional expression (12) indicates that the principal ray LD2 deflected by the J-th deflection surface 53 scans further on the positive side in the scanning direction than the center image height 712, i.e., finishes scanning the center image height 712. Then, considering that the normal angle of the J-th deflection surface 53 is $\theta 2 = \theta 1 - 360°/N \times (J-1)$, if each of $\theta 1 = \rho 1 + \omega 0$, $\alpha 1 = -\alpha 2$, and $\omega 1_{min} = -\omega 2_{max}$ is substituted into conditional expression (12) to transform conditional expression (12) as follows, conditional expression (13) is derived.

$$2 \times (\theta 1 - 360°/N \times (J-1)) - (-\alpha 1) > \omega 2_{max} \leftrightarrow 2 \times (\rho 1 + \omega 0 - 360°/N \times (J-1)) + \alpha 1 > -\omega 1_{min} \leftrightarrow \alpha 1 > -2 \times (\rho 1 + \omega 0 - 360°/N \times (J-1)) - \omega 1_{min} \leftrightarrow \alpha 1 > -2 \times (\rho 1 + \omega 0) + 2 \times 360°/N \times (J-1) - \omega 1_{min} \quad (13)$$

Further, by the time when the principal ray LD2 deflected by the J-th deflection surface 53 starts scanning the most off-axis image height 714 on the negative side, the principal ray LD1 deflected by the first deflection surface 52 needs to finish scanning the most off-axis image height. 710 on the positive side. In other words, when the principal ray LD1 starts being incident on the first deflection surface 52, and the first deflection surface 52 starts deflecting the principal ray LD1, i.e., when $\theta 1 = \rho 1 - \omega 0$, the following conditional expression (14) needs to be satisfied:

$$\omega 2 < \omega 2_{min} \leftrightarrow$$

$$2 \times \theta 2 - \alpha 2 < \omega 2_{min} \quad (14).$$

Conditional expression (14) indicates that the principal ray LD2 deflected by the J-th deflection surface 53 scans further on the negative side in the scanning direction than the most off-axis image height 714, i.e., indicates the state before the principal ray LD2 starts scanning the most off-axis image height 714. Similarly to conditional expression (12), if each value is substituted into conditional expression (14) to transform conditional expression (14) as follows, conditional expression (15) is derived.

$$2 \times (\theta 1 - 360°/N \times (J-1)) - (-\alpha 1) < \omega 2_{min} \leftrightarrow 2 \times (\rho 1 - \omega 0 - 360°/N \times (J-1)) + \alpha 1 < -\omega 1_{max} \leftrightarrow \alpha 1 < -2 \times (\rho 1 - \omega 0 - 360°/N \times (J-1)) - \omega 1_{max} \leftrightarrow \alpha 1 < -2 \times (\rho 1 - \omega 0) + 2 \times 360°/N \times (J-1) - \omega 1_{max} \quad (15)$$

Based on the above, to satisfy the first condition, the above conditional expressions (9), (10), (11), (13), and (15) may be satisfied.

(Second Condition)

A second condition is that while the principal ray LD1 deflected by the first deflection surface 52 is scanning the range from $\omega1_{min}$ to $\omega1_{max}$, the principal ray LD2 deflected by the J-th deflection surface 53 does not scan the range from $\omega2_{min}$ to $\omega2_{max}$. In other words, while the principal ray LD2 deflected by the J-th deflection surface 53 is scanning the range from $\omega2_{min}$ to $\omega2_{max}$, the principal ray LD1 deflected by the first deflection surface 52 does not scan the range from $\omega1_{min}$ to $\omega1_{max}$. This indicates a condition for achieving time division scanning.

First, at the timing when the principal ray LD1 deflected by the first deflection surface 52 scans the most off-axis image height 710 on the positive side, the principal ray LD2 deflected by the J-th deflection surface 53 needs to scan outside the most off-axis image height 714 on the negative side. That is, when the normal angle of the first deflection surface 52 is $\theta1_{max}=(\omega1_{max}+\alpha1)/2$, the above conditional expression (14) needs to be satisfied. Thus, if each value is substituted into conditional expression (14) to transform conditional expression (14) as follows, conditional expression (16) is derived.

$$2\times\theta1_{max}-2\times360°/N\times(J-1)-(-\alpha1)<\omega2_{min} \leftrightarrow (\omega1_{max}+\alpha1)-2\times360°/N\times(J-1)+\alpha1<-\omega1_{max} \leftrightarrow \alpha1<-\omega1_{max}+360°/N\times(J-1) \quad (16)$$

Further, at the timing when the principal ray LD2 deflected by the J-th deflection surface 53 starts scanning the most off-axis image height 714 on the negative side, the principal ray LD1 deflected by the first deflection surface 52 needs to scan outside the most off-axis image height 710 on the positive side. As described above, if the principal rays LD1 and LD2 are incident on the deflector 5 from directions symmetrical to each other with respect to the reference plane 9, this condition is the same as conditional expression (16).

Accordingly, to satisfy the second condition, the above conditional expression (16) may be satisfied.

If the optical scanning device 200 cannot be configured to satisfy conditional expression (16) due to design constraints, a light blocking member for preventing the first beam from being incident on the second area 72 and the second beam from being incident on the first area 71 may be provided. Specifically, a light blocking member for blocking the first beam proceeding from the first deflection surface 52 to the second area 72, and for blocking the second beam proceeding from the J-th deflection surface 53 to the first area 71 may be provided. Consequently, even if conditional expression (16) is not satisfied, it is possible to prevent the first and second beams from simultaneously reaching the scanned surface 7.

The position and the shape of the light blocking member are not particularly limited so long as the light blocking member is configured to block an unnecessary beam. For example, in a case where a light blocking member including a light-blocking surface parallel to the reference plane 9 is provided between the deflector 5 and the scanned surface 7, the light blocking member may be placed at the position where the light blocking member overlaps the reference plane 9 near the scanned surface 7, or placed near the exit positions, in each of the imaging optical systems, of the beams proceeding to the center image height 712.

(Third Condition)

A third condition is that while the principal ray LD1 deflected by the first deflection surface 52 is scanning the range from $\omega1_{min}$ to $\omega1_{max}$, the principal ray LD2 does not proceed backward along the optical path by being reflected from the J-th deflection surface 53. In other words, while the principal ray LD2 deflected by the J-th deflection surface 53 is scanning the range from $\omega2_{min}$ to $\omega2_{max}$, the principal ray LD1 does not proceed backward along the optical path by being reflected from the first deflection surface 52.

In a case where the principal rays LD1 and LD2 are incident on the deflector 5 from directions parallel to the xy plane, and if the light source 1 emits light at the timing when the incident direction of each principal ray is perpendicular (upright) to the deflection surface, the principal ray proceeds backward along the optical path and returns to the light source 1. It is known that if light incident on the light source 1 (return light) thus occurs, the light emission operation of the light source 1 becomes unstable, and the amount of luminescence of the light source 1 is not stabilized. This problem is conspicuous in a case where the light source 1 is a semiconductor laser. Thus, it is necessary to control the light source 1 not to emit light at the timing when each principal ray and the deflection surface are upright to each other.

In response, a description is given of a condition for the principal ray LD2 and the J-th deflection surface 53 not to be upright to each other while the principal ray LD1 is scanning the range from $\omega_{min}$ to $\omega1_{max}$. As described above, since the normal angle of the first deflection surface 52 is $\theta1=(\omega1+\alpha1)/2$, the above conditional expression (8) can be transformed into the following conditional expression (17):

$$(\omega1_{min}+\alpha1)/2<\theta1<(\omega1_{max}+\alpha1)/2 \quad (17).$$

Further, considering that $\theta2=\theta1-360°/N\times(j-1)$, i.e., $\theta1=\theta2-360°/N\times(J+1)$, and $\alpha2=-\alpha1$, conditional expression (17) can be divided into the following conditional expressions (18) and (19):

$$(\omega1_{min}+\alpha1)/2<\theta2+360°/N\times(J-1)<(\omega1_{max}+\alpha1)/2$$
$$\leftrightarrow \theta2>(\omega1_{min}+\alpha1)/2-360°/N\times(J-1) \quad (18),$$

and $$\theta2<(\omega1_{max}+\alpha1)/2-360°/N\times(J-1) \quad (19)$$

That is, if conditional expressions (18) and (19) are satisfied, the principal ray LD1 scans the range from $\omega1_{min}$ to $\omega1_{max}$. In this case, a condition for the principal ray LD2 and the J-th deflection surface 53 not to be upright to each other is $\theta2\neq\alpha2=-\alpha1$. Thus, the optical scanning device 200 may be configured such that $\alpha2$ does not satisfy conditional expressions (18) and (19). That is, to satisfy the third condition, either the following conditional expression (20) or (21) may be satisfied.

$$\alpha2=-\alpha1<(\omega1_{min}+\alpha1)/2-360°/N\times(J-1) \leftrightarrow \alpha1>(2\times 360°/N\times(J-1)-\omega1_{min})/3 \quad (20),$$

and $$\alpha2=-\alpha1>(\omega1_{max}+\alpha1)/2-360°/N\times(J-1) \leftrightarrow \alpha1<(2\times 360°/N\times(J-1)-\omega1_{max})/3 \quad (21)$$

If conditional expressions (20) and (21) are not satisfied, a configuration (a sub-scanning oblique incidence system) may be employed in which the principal rays LD1 and LD2 are obliquely incident on the deflector 5 in the sub-scanning cross section. Consequently, also in a case where the light source 1 is caused to emit light at the timing when each principal ray and the deflection surface are upright to each other, it is possible to reduce return light incident on the light source 1. In this case, if the incident angles (the angles to the xy plane or the sub-scanning incident angles) of the principal rays LD1 and LD2 on the respective deflection surfaces are β1 and β2, respectively, it is also possible to prevent the occurrence of return light by making the values of β1 and β2 sufficiently great.

In such a case, it is desirable that each of the principal rays LD1 and LD2 should be made incident on the deflector 5 from one side with respect to a plane perpendicular to the rotational axis 51. Based on this configuration, it is possible to reduce the shifts in the printing positions (the printing heights) in the sub-scanning direction on the scanned surface 7, which are caused by making the beams obliquely incident on the deflector 5. To significantly reduce the shifts in the printing heights, it is desirable to set the incident angles of the principal rays LD1 and LD2 such that β1=β2.

If, on the other hand, a configuration for making the principal rays LD1 and LD2 incident on the deflector 5 from different sides from each other with respect to a plane perpendicular to the rotational axis 51 is employed, the shifts in the printing heights become great. In this case, the timings of printing by the principal rays LD1 and LD2 are shifted, whereby it is possible to correct the shifts in the printing heights.

Based on the above, the optical scanning device 200 according to the present exemplary embodiment achieves the downsizing and simplification of the entire apparatus while employing a cascade scanning method.

Next, further exemplary embodiments of the optical scanning device according to the above exemplary embodiments are described in detail.

An optical scanning device 110 according to a third exemplary embodiment of the present invention is described below. In the optical scanning device 110 according to the present exemplary embodiment, components equivalent to those of the optical scanning device according to the above exemplary embodiments are not described.

The optical scanning device 110 according to the present exemplary embodiment is different from the optical scanning device according to the above exemplary embodiments in that imaging elements (imaging lenses) included in first and second imaging optical systems 61 and 62 are formed in an integrated manner. Specifically, the first and second imaging optical systems 61 and 62 include first and second imaging elements formed in an integrated manner. The first and second imaging elements include optical surfaces symmetrical to each other with respect to a reference plane 9.

Figure 6:
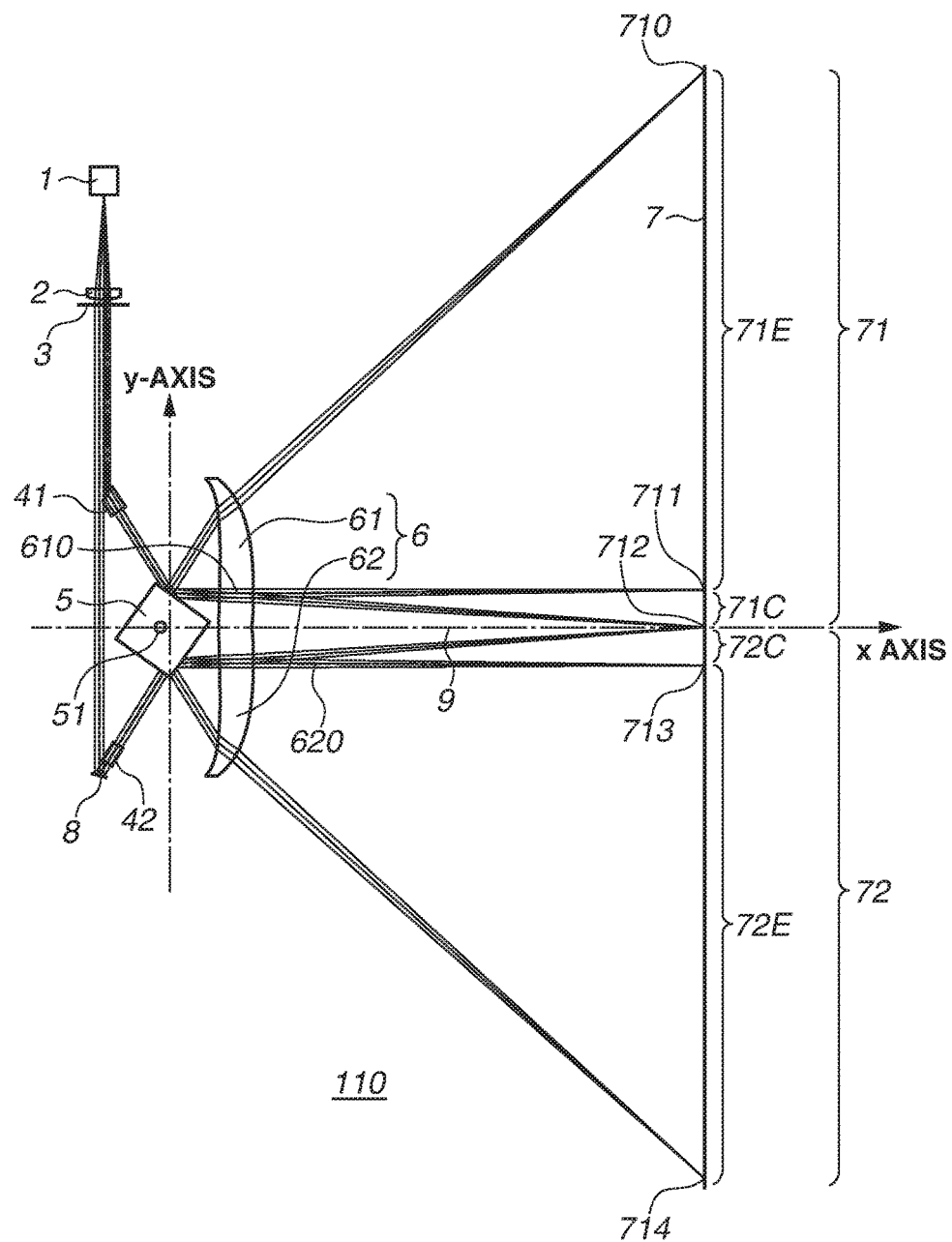
FIG. 6 is a schematic diagram of a main part of an optical scanning device according to a third exemplary embodiment of the present invention.
Figure 7:
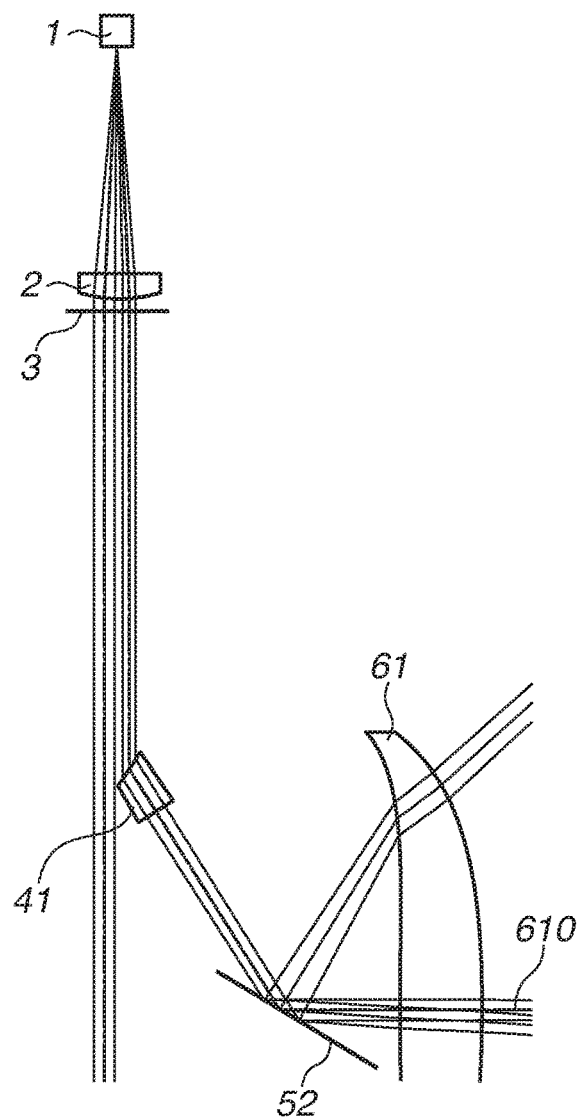
FIG. 7 is a partial enlarged view of the optical scanning device according to the third exemplary embodiment.

FIG. 6 is a schematic diagram of a main part of the optical scanning device 110 according to the present exemplary embodiment. FIG. 7 is a view obtained by enlarging a part of FIG. 6. The optical scanning device 110 includes a light source 1, a coupling lens (collimator lens) 2, a diaphragm 3, a separation element (optical path separation element) 41, a cylinder lens (cylindrical lens) 42, a reflection element (returning mirror) 8, a deflector 5, and an imaging optical system 6. In the present exemplary embodiment, the deflection point of a first beam on the deflector 5 when the first beam proceeds to a printing position 711 is 2.359 mm away from the rotational axis 51 in the x-axis direction.

In the present exemplary embodiment, a beam emitted from the light source 1 is converted into a parallel beam by the coupling lens 2 changing the degree of convergence of the beam. Then, the parallel beam is restricted by the diaphragm 3, whereby the beam width is determined. In the diaphragm 3, two apertures are provided. Thus, the beam emitted from the common light source 1 is passed through the two apertures, whereby it is possible to generate the first and second beams. After passing through the diaphragm 3, the first beam is incident on the separation element 41, and the second beam is incident on the reflection element 8 not through the separation element 41. The separation element 41 functions as a prism for changing the moving direction of the first beam in the main scanning cross section and thereby can separate the optical paths of the first and second beams.

The first beam deflected by the separation element 41 is directly incident on the deflector 5, and the second beam reflected from the reflection element 8 is incident on the deflector 5 through the cylinder lens 42. The exit surface of the separation element 41 and the incidence surface of the cylinder lens 42 are cylindrical surfaces having refractive power (curvature) in the sub-scanning cross section. These cylindrical surfaces collect the first and second beams in the sub-scanning cross section. Accordingly, line images are formed near deflection surfaces on both sides of the deflector 5 with respect to the reference plane 9.

As described above, in the present exemplary embodiment, a configuration is employed in which the first and second beams are generated from a beam emitted from a single light source. Then, the light source 1, the coupling lens 2, and the diaphragm 3 are commonly used for the first and second beams. Thus, it is not necessary to provide a plurality of light sources, a plurality of coupling lenses, and a plurality of diaphragms. Consequently, it is possible to achieve the downsizing of the entire apparatus by reducing the number of components.

If the separation element 41 can separate the first and second beams, the optical scanning device 110 may be configured such that the second beam passes through the separation element 41 where necessary. In this case, instead of the cylinder lens 42, the separation element 41 may collect the second beam in the sub-scanning cross section. Alternatively, the separation element 41 may include a one-way mirror, and cylinder lenses may be provided on the optical paths of the separated first and second beams. In such a case, since the separation element 41 can generate the first and second beams, a diaphragm in which a single aperture is provided on each of the optical paths of the first and second beams may be placed instead of the diaphragm 3.

The deflector 5 according to the present exemplary embodiment is a rotary polygon mirror (a polygon mirror) including four deflection surfaces. The deflector 5 deflects the first and second beams while rotating at a constant speed by the driving force of a driving unit (motor) (not illustrated), and scans an effective area of a scanned surface 7 in the main scanning direction accordingly. As the deflector 5, a rotary polygon mirror including five or more deflection surfaces may be employed.

The first and second beams deflected by the deflector 5 are guided by first and second imaging optical systems 61 and 62, which are included in the imaging optical system 6, to first and second areas 71 and 72, respectively, in the effective area of the scanned surface 7. Unlike the above exemplary embodiments, the first and second imaging optical systems 61 and 62 according to the present exemplary embodiment are a compound element (a compound lens) formed in an integrated manner. Thus, in the present exemplary embodiment, the first and second imaging optical systems 61 and 62 can be integrally molded as a plastic molded lens. Thus, it is possible to reduce the number of components and the man-hours for manufacturing and assembling the entire apparatus as compared with the above-described exemplary embodiments.

Tables 1 to 5 illustrate an example of the design of the optical scanning device 110 according to the present exemplary embodiment. In each table, the optical members in the optical path from the light source 1 to the first area 71 correspond to a first optical system, and the optical members in the optical path from the light source 1 to the second area 72 correspond to a second optical system. Further, in tables 2 and 4, angles α1 and α2 indicate the angles between the first and second beams, respectively, incident on the deflector 5 and the x-axis. In the present exemplary embodiment, sub-scanning incident angles β1 and β2 are both 0°.

TABLE 1

| Common Specifications | Value |
|---|---|
| Wavelength [nm] of light source | 790 |
| Refractive index of coupling lens | 1.576 |
| Refractive index of separation element | 2.000 |

TABLE 1-continued

| Common Specifications | | Value |
|---|---|---|
| Refractive index of imaging element | | 1.524 |
| Coordinates [mm] of rotational axis of deflector | x-coordinate | −2.359 |
| | y-coordinate | 0.000 |
| Imaging coefficient K | | 90.37 |
| Scanning characteristic coefficient P | | 9 |
| Radius Rd [mm] of circumcircle of deflector | | 10 |
| Number of surfaces of deflector | | 4 |
| Width [mm] of effective area | | 213.6 |

TABLE 2

Specifications of First Optical System

| | | Value |
|---|---|---|
| Diaphragm: width [mm] of oval aperture | Main scanning | 1.020 |
| | Sub-scanning | 2.200 |
| Outside scanning viewing angle [°] | | 57.6 |
| Inside scanning viewing angle [°] | | −4.29 |
| Outside printing area Ye [mm] | | 100.0 |
| Inside printing area Yc [mm] | | 6.777 |
| Angle α1 [°] between first beam and x-axis | | 122 |
| Lx [mm] | | 2.359 |

Arrangement of First Optical System

| mm | | Origin of each plane | | | Direction of optical axis (in direction cosine) | | |
|---|---|---|---|---|---|---|---|
| | | x-coordinate | y-coordinate | z-coordinate | x-component | y-component | z-component |
| Light source | | −12.750 | 83.481 | 0.000 | 0.000 | 1.000 | 0.000 |
| Coupling lens | Incidence surface | −12.750 | 65.481 | 0.000 | 0.000 | 1.000 | 0.000 |
| | Exit surface | −12.750 | 63.481 | 0.000 | 0.000 | 1.000 | 0.000 |
| Diaphragm | | −12.000 | 62.481 | 0.000 | 0.000 | 1.000 | 0.000 |
| Separation element | Incidence surface | −12.000 | 25.981 | 0.000 | −0.836 | 0.549 | 0.000 |
| | Exit surface | −9.880 | 22.589 | 0.000 | −0.530 | 0.848 | 0.000 |
| Deflector | | 1.069 | 6.185 | 0.000 | 0.485 | 0.875 | 0.000 |
| Imaging element | Incidence surface | 9.500 | 6.777 | 0.000 | 1.000 | 0.000 | 0.000 |
| | Exit surface | 16.100 | 6.777 | 0.000 | 1.000 | 0.000 | 0.000 |
| Scanned surface | | 103.000 | 6.777 | 0.000 | 1.000 | 0.000 | 0.000 |

TABLE 3

Aspheric Surfaces of First Optical System
Main Scanning Cross Section

| | | Coupling lens | | Separation element | | Imaging element 61 | |
|---|---|---|---|---|---|---|---|
| | | Incidence surface | Exit surface | Incidence surface | Exit surface | Incidence surface | Exit surface |
| Upper | Ru | 0.00E+00 | −1.11E+01 | 0.00E+00 | 0.00E+00 | 7.84E+01 | −1.17E+02 |
| | ku | 0.00E+00 | 0.00E+00 | 0.00E+00 | 0.00E+00 | −1.63E+02 | 2.41E+01 |
| | B2u | 0.00E+00 | 2.00E−04 | 0.00E+00 | 0.00E+00 | 0.00E+00 | 0.00E+00 |
| | B4u | 0.00E+00 | 0.00E+00 | 0.00E+00 | 0.00E+00 | −4.04E−05 | −2.39E−05 |
| | B6u | 0.00E+00 | 0.00E+00 | 0.00E+00 | 0.00E+00 | 1.50E−07 | 3.42E−08 |
| | B8u | 0.00E+00 | 0.00E+00 | 0.00E+00 | 0.00E+00 | −2.59E−10 | −6.36E−11 |
| | B10u | 0.00E+00 | 0.00E+00 | 0.00E+00 | 0.00E+00 | 9.50E−14 | 2.68E−13 |
| | B12u | 0.00E+00 | 0.00E+00 | 0.00E+00 | 0.00E+00 | 2.60E−17 | −4.27E−16 |

TABLE 3-continued

| | | | | | | | |
|---|---|---|---|---|---|---|---|
| | B14u | 0.00E+00 | 0.00E+00 | 0.00E+00 | 0.00E+00 | 0.00E+00 | 0.00E+00 |
| | B16u | 0.00E+00 | 0.00E+00 | 0.00E+00 | 0.00E+00 | 0.00E+00 | 0.00E+00 |
| Lower | Rl | 0.00E+00 | −1.11E+01 | 0.00E+00 | 0.00E+00 | 7.84E+01 | −1.17E+02 |
| | kl | 0.00E+00 | 2.00E−04 | 0.00E+00 | 0.00E+00 | −1.63E+02 | 2.41E+01 |
| | B2l | 0.00E+00 | 0.00E+00 | 0.00E+00 | 0.00E+00 | 0.00E+00 | 0.00E+00 |
| | B4l | 0.00E+00 | 0.00E+00 | 0.00E+00 | 0.00E+00 | −4.04E−05 | −2.39E−05 |
| | B6l | 0.00E+00 | 0.00E+00 | 0.00E+00 | 0.00E+00 | 1.50E−07 | 3.42E−08 |
| | B8l | 0.00E+00 | 0.00E+00 | 0.00E+00 | 0.00E+00 | −2.59E−10 | −6.36E−11 |
| | B10l | 0.00E+00 | 0.00E+00 | 0.00E+00 | 0.00E+00 | 9.50E−14 | 2.68E−13 |
| | B12l | 0.00E+00 | 0.00E+00 | 0.00E+00 | 0.00E+00 | 2.60E−17 | −4.27E−16 |
| | B14l | 0.00E+00 | 0.00E+00 | 0.00E+00 | 0.00E+00 | 0.00E+00 | 0.00E+00 |
| | B16l | 0.00E+00 | 0.00E+00 | 0.00E+00 | 0.00E+00 | 0.00E+00 | 0.00E+00 |

Sub-Scanning Cross Section

| | | Coupling lens | | Separation element | | Imaging element 61 | |
|---|---|---|---|---|---|---|---|
| | | Incidence surface | Exit surface | Incidence surface | Exit surface | Incidence surface | Exit surface |
| Upper | ru | 0.00E+00 | −1.11E+01 | 0.00E+00 | −2.11E+01 | −7.99E+00 | −4.37E+00 |
| | E2u | 0.00E+00 | 2.00E−04 | 0.00E+00 | 0.00E+00 | 1.71E−03 | 8.12E−04 |
| | E4u | 0.00E+00 | 0.00E+00 | 0.00E+00 | 0.00E+00 | −1.65E−05 | −5.52E−06 |
| | E6u | 0.00E+00 | 0.00E+00 | 0.00E+00 | 0.00E+00 | 9.22E−08 | 2.51E−08 |
| | E8u | 0.00E+00 | 0.00E+00 | 0.00E+00 | 0.00E+00 | −2.92E−10 | −6.67E−11 |
| | E10u | 0.00E+00 | 0.00E+00 | 0.00E+00 | 0.00E+00 | 3.89E−13 | 6.89E−14 |
| | E12u | 0.00E+00 | 0.00E+00 | 0.00E+00 | 0.00E+00 | 0.00E+00 | 0.00E+00 |
| | E14u | 0.00E+00 | 0.00E+00 | 0.00E+00 | 0.00E+00 | 0.00E+00 | 0.00E+00 |
| | E16u | 0.00E+00 | 0.00E+00 | 0.00E+00 | 0.00E+00 | 0.00E+00 | 0.00E+00 |
| Lower | rl | 0.00E+00 | −1.11E+01 | 0.00E+00 | −2.11E+01 | −7.99E+00 | −4.37E+00 |
| | E2l | 0.00E+00 | 2.00E−04 | 0.00E+00 | 0.00E+00 | 1.71E−03 | 8.12E−04 |
| | E4l | 0.00E+00 | 0.00E+00 | 0.00E+00 | 0.00E+00 | −1.65E−05 | −5.52E−06 |
| | E6l | 0.00E+00 | 0.00E+00 | 0.00E+00 | 0.00E+00 | 9.22E−08 | 2.51E−08 |
| | E8l | 0.00E+00 | 0.00E+00 | 0.00E+00 | 0.00E+00 | −2.92E−10 | −6.67E−11 |
| | E10l | 0.00E+00 | 0.00E+00 | 0.00E+00 | 0.00E+00 | 3.89E−13 | 6.89E−14 |
| | E12l | 0.00E+00 | 0.00E+00 | 0.00E+00 | 0.00E+00 | 0.00E+00 | 0.00E+00 |
| | E14l | 0.00E+00 | 0.00E+00 | 0.00E+00 | 0.00E+00 | 0.00E+00 | 0.00E+00 |
| | E16l | 0.00E+00 | 0.00E+00 | 0.00E+00 | 0.00E+00 | 0.00E+00 | 0.00E+00 |

TABLE 4

Specifications of Second Optical System

| | | Value |
|---|---|---|
| Diaphragm: width [mm] of oval aperture | Main scanning | 1.680 |
| | Sub-scanning | 2.200 |
| Inside scanning viewing angle [°] | | 4.29 |
| Outside scanning viewing angle [°] | | −57.6 |
| Inside printing area Yc [mm] | | 6.777 |
| Outside printing area Ye [mm] | | 100.0 |
| Angle α2 [°] between second beam and x-axis | | −122 |
| Lx [mm] | | 2.359 |

Arrangement of Second Optical System

| [mm] | | Origin of each plane | | | Direction of optical axis (in direction cosine) | | |
|---|---|---|---|---|---|---|---|
| | | x-coordinate | y-coordinate | z-coordinate | x-component | y-component | z-component |
| Light source | | −12.750 | 83.481 | 0.000 | 0.000 | 1.000 | 0.000 |
| Coupling lens | Incidence surface | −12.750 | 65.481 | 0.000 | 0.000 | 1.000 | 0.000 |
| | Exit surface | −12.750 | 63.481 | 0.000 | 0.000 | 1.000 | 0.000 |
| Diaphragm | | −13.500 | 62.481 | 0.000 | 0.000 | 1.000 | 0.000 |
| Reflection element | | −13.500 | −28.382 | 0.000 | −0.276 | −0.961 | 0.000 |
| Cylinder lens | Incidence surface | −12.000 | −25.981 | 0.000 | −0.530 | −0.848 | 0.000 |
| | Exit surface | −9.880 | −22.589 | 0.000 | −0.530 | −0.848 | 0.000 |
| Deflector | | 1.069 | −6.185 | 0.000 | 0.485 | −0.875 | 0.000 |

TABLE 4-continued

| | | | | | | | |
|---|---|---|---|---|---|---|---|
| Imaging element | Incidence surface | 9.500 | −6.777 | 0.000 | 1.000 | 0.000 | 0.000 |
| | Exit surface | 16.100 | −6.777 | 0.000 | 1.000 | 0.000 | 0.000 |
| Scanned surface | | 103.000 | −6.777 | 0.000 | 1.000 | 0.000 | 0.000 |

TABLE 5

Aspheric Surfaces of Second Optical System

| | | Coupling lens | | Cylinder lens | | Imaging element 62 | |
|---|---|---|---|---|---|---|---|
| | | Incidence surface | Exit surface | Incidence surface | Exit surface | Incidence surface | Exit surface |
| | | Main Scanning Cross Section | | | | | |
| Upper | Ru | 0.00E+00 | −1.11E+01 | 0.00E+00 | 0.00E+00 | 7.84E+01 | −1.17E+02 |
| | ku | 0.00E+00 | 0.00E+00 | 0.00E+00 | 0.00E+00 | −1.63E+02 | 2.41E+01 |
| | B2u | 0.00E+00 | 2.00E−04 | 0.00E+00 | 0.00E+00 | 0.00E+00 | 0.00E+00 |
| | B4u | 0.00E+00 | 0.00E+00 | 0.00E+00 | 0.00E+00 | −4.04E−05 | −2.39E−05 |
| | B6u | 0.00E+00 | 0.00E+00 | 0.00E+00 | 0.00E+00 | 1.50E−07 | 3.42E−08 |
| | B8u | 0.00E+00 | 0.00E+00 | 0.00E+00 | 0.00E+00 | −2.59E−10 | −6.36E−11 |
| | B10u | 0.00E+00 | 0.00E+00 | 0.00E+00 | 0.00E+00 | 9.50E−14 | 2.68E−13 |
| | B12u | 0.00E+00 | 0.00E+00 | 0.00E+00 | 0.00E+00 | 2.60E−17 | −4.27E−16 |
| | B14u | 0.00E+00 | 0.00E+00 | 0.00E+00 | 0.00E+00 | 0.00E+00 | 0.00E+00 |
| | B16u | 0.00E+00 | 0.00E+00 | 0.00E+00 | 0.00E+00 | 0.00E+00 | 0.00E+00 |
| Lower | Rl | 0.00E+00 | −1.11E+01 | 0.00E+00 | 0.00E+00 | 7.84E+01 | −1.17E+02 |
| | kl | 0.00E+00 | 2.00E−04 | 0.00E+00 | 0.00E+00 | −1.63E+02 | 2.41E+01 |
| | B2l | 0.00E+00 | 0.00E+00 | 0.00E+00 | 0.00E+00 | 0.00E+00 | 0.00E+00 |
| | B4l | 0.00E+00 | 0.00E+00 | 0.00E+00 | 0.00E+00 | −4.04E−05 | −2.39E−05 |
| | B6l | 0.00E+00 | 0.00E+00 | 0.00E+00 | 0.00E+00 | 1.50E−07 | 3.42E−08 |
| | B8l | 0.00E+00 | 0.00E+00 | 0.00E+00 | 0.00E+00 | −2.59E−10 | −6.36E−11 |
| | B10l | 0.00E+00 | 0.00E+00 | 0.00E+00 | 0.00E+00 | 9.50E−14 | 2.68E−13 |
| | B12l | 0.00E+00 | 0.00E+00 | 0.00E+00 | 0.00E+00 | 2.60E−17 | −4.27E−16 |
| | B14l | 0.00E+00 | 0.00E+00 | 0.00E+00 | 0.00E+00 | 0.00E+00 | 0.00E+00 |
| | B16l | 0.00E+00 | 0.00E+00 | 0.00E+00 | 0.00E+00 | 0.00E+00 | 0.00E+00 |
| | | Sub Scanning Cross Section | | | | | |
| Upper | ru | 0.00E+00 | −1.11E+01 | 0.00E+00 | −2.11E+01 | −7.99E+00 | −4.37E+00 |
| | E2u | 0.00E+00 | 2.00E−04 | 0.00E+00 | 0.00E+00 | 1.71E−03 | 8.12E−04 |
| | E4u | 0.00E+00 | 0.00E+00 | 0.00E+00 | 0.00E+00 | −1.65E−05 | −5.52E−06 |
| | E6u | 0.00E+00 | 0.00E+00 | 0.00E+00 | 0.00E+00 | 9.22E−08 | 2.51E−08 |
| | E8u | 0.00E+00 | 0.00E+00 | 0.00E+00 | 0.00E+00 | −2.92E−10 | −6.67E−11 |
| | E10u | 0.00E+00 | 0.00E+00 | 0.00E+00 | 0.00E+00 | 3.89E−13 | 6.89E−14 |
| | E12u | 0.00E+00 | 0.00E+00 | 0.00E+00 | 0.00E+00 | 0.00E+00 | 0.00E+00 |
| | E14u | 0.00E+00 | 0.00E+00 | 0.00E+00 | 0.00E+00 | 0.00E+00 | 0.00E+00 |
| | E16u | 0.00E+00 | 0.00E+00 | 0.00E+00 | 0.00E+00 | 0.00E+00 | 0.00E+00 |
| Lower | rl | 0.00E+00 | −1.11E+01 | 0.00E+00 | −2.11E+01 | −7.99E+00 | −4.37E+00 |
| | E2l | 0.00E+00 | 2.00E−04 | 0.00E+00 | 0.00E+00 | 1.71E−03 | 8.12E−04 |
| | E4l | 0.00E+00 | 0.00E+00 | 0.00E+00 | 0.00E+00 | −1.65E−05 | −5.52E−06 |
| | E6l | 0.00E+00 | 0.00E+00 | 0.00E+00 | 0.00E+00 | 9.22E−08 | 2.51E−08 |
| | E8l | 0.00E+00 | 0.00E+00 | 0.00E+00 | 0.00E+00 | −2.92E−10 | −6.67E−11 |
| | E10l | 0.00E+00 | 0.00E+00 | 0.00E+00 | 0.00E+00 | 3.89E−13 | 6.89E−14 |
| | E12l | 0.00E+00 | 0.00E+00 | 0.00E+00 | 0.00E+00 | 0.00E+00 | 0.00E+00 |
| | E14l | 0.00E+00 | 0.00E+00 | 0.00E+00 | 0.00E+00 | 0.00E+00 | 0.00E+00 |
| | E16l | 0.00E+00 | 0.00E+00 | 0.00E+00 | 0.00E+00 | 0.00E+00 | 0.00E+00 |

Next, the surface shapes of the optical surfaces (the lens surfaces) according to the present exemplary embodiment are described.

The shape (the meridional shape) in the main scanning cross section including the surface vertices of the incidence surface and the exit surface of each of the coupling lens 2, the separation element 41, the cylinder lens 42, the first imaging optical system 61, and the second imaging optical system 62 according to the present exemplary embodiment is represented by the following expression. In the present exemplary embodiment, a local coordinate system XYZ is defined where the intersection of the surface vertex of each optical surface and the optical axis is the origin, an axis in the optical axis direction is an X-axis, an axis orthogonal to the X-axis in the main scanning cross section is a Y-axis, and an axis orthogonal to the X-axis and the Y-axis is a Z-axis.

$$X = \frac{Y^2/R}{1 + \left(1 - (1+k)(Y/R)^2\right)^{1/2}} + B_2 Y^2 + B_4 Y^4 + B_6 Y^6 + B_8 Y^8 + B_{10} Y^{10} + B_{12} Y^{12} + B_{14} Y^{14} + B_{16} Y^{16}$$

R is the radius of curvature (the meridional radius of curvature) in the main scanning cross section on the optical axis, and k, $B_2$, $B_4$, $B_6$, $B_8$, $B_{10}$, $B_{12}$, $B_{14}$, and $B_{16}$ are aspheric coefficients in the main scanning cross section. The numerical values of the aspheric coefficients $B_2$ to $B_{16}$ may be different from each other between both sides (the positive and negative sides in the Y-axis direction) with respect to the optical axis (the X-axis). This can make the meridional shape asymmetrical with respect to the optical axis in the main scanning direction. As illustrated in tables 3 and 5, the shapes in the main scanning cross section of the optical surfaces of the first and second imaging optical systems 61 and 62 according to the present exemplary embodiment are aspheric shapes including terms up to twelfth order.

In coefficients in table 3, the index "u" indicates the positive side in the Y-axis direction (a side of the light source 1), and the index "l" indicates the negative side in the Y-axis direction (a side distant from the light source 1). A coefficient without the index "u" or "l" is a coefficient common to both sides.

Further, the shape (the sagittal shape), at each position in the main scanning direction, in the sub-scanning cross section of each of the incidence surfaces and the exit surfaces of the first and second imaging optical systems 61 and 62 according to the present exemplary embodiment is represented by the following expression. The sagittal shape can also be said to be the surface shape, at each position (each image height) in the main scanning direction, in a cross section perpendicular to the main scanning cross section including the surface normal on the meridional line.

$$S = \frac{Z^2/r'}{1+\sqrt{1-\left(\frac{Z}{r'}\right)^2}} + \sum_{ij} m_{ij} Y^i Z^j$$

In the above expression, $m_{i\_j}$ is an aspheric coefficient in the sub-scanning cross section. Further, r' indicates the radius of curvature (the sagittal radius of curvature) in the sub-scanning cross section at a position away by Y from the optical axis in the main scanning direction and is represented by the following expression.

$$\frac{1}{r'} = \frac{1}{r} + E_2 Y^2 + E_4 Y^4 + E_6 Y^6 + E_8 Y^8 + E_{10} Y^{10} + E_{12} Y^{12} + E_{14} Y^{14} + E_{16} Y^{16}$$

In the above expression, r is the sagittal radius of curvature on the optical axis, and $E_2$, $E_4$, $E_6$, $E_8$, $E_{10}$, $E_{12}$, $E_{14}$, and $E_{16}$ are sagittal change coefficients. The numerical values of the sagittal change coefficients $E_2$ to $E_{16}$ are different from each other between the positive and negative sides in the Y-axis direction, whereby it is possible to asymmetrically set the aspheric surface amount of the sagittal shape in the main scanning direction. The above expression includes only even number terms, but may additionally include odd number terms where necessary.

Further, the first-order term of Z in the expression of a sagittal shape S is a term contributing to the tilt amount (the sagittal tilt amount) of the lens surface in the sub-scanning cross section. Thus, aspheric coefficients $m_{0\_1}u$ to $m_{16\_1}u$ on the positive side in the Y-axis direction and aspheric coefficients $m_{0\_1}l$ to $m_{16\_1}l$ on the negative side in the Y-axis direction are set to numerical values different from each other, whereby it is possible to asymmetrically change the sagittal tilt amount in the main scanning direction.

The first and second imaging optical systems 61 and 62 according to the present exemplary embodiment are configured such that in the main scanning cross section, beams deflected by the deflector 5 scan the scanned surface 7 at a non-constant speed, i.e., do not satisfy an fθ characteristic (a constant-speed characteristic). To provide the fθ characteristic for each imaging optical system, it is necessary to make the shape in the main scanning cross section of the optical surface greatly different between an on-axis image height and an off-axis image height. If the imaging optical system is brought too close to the deflector 5, the shape in the main scanning cross section of the optical surface changes sharply, and comatic aberration increases. Thus, to achieve both the optical performance and the fθ characteristic of each imaging optical system, it is necessary to place the imaging optical system somewhat away from the deflector 5.

In response to this, in the present exemplary embodiment, the first and second imaging optical systems 61 and 62 are provided with a scanning characteristic in which beams do not satisfy constant-velocity properties on the scanned surface 7. Consequently, it is possible to place each imaging optical system closer to the deflector 5 while maintaining the optical performance of the imaging optical system, and achieve a smaller diameter of the imaging optical system and the further downsizing of the entire apparatus. Further, based on this configuration, it is also possible to obtain the effect that the degree of freedom in designing each imaging optical system can be increased.

When the scanning angle (the deflection angle) of the deflector 5 is θ, and the light collection position (the image height), in the main scanning direction on the scanned surface 7, of a beam deflected at the scanning angle θ is Y [mm], and an imaging coefficient at the on-axis image height is K [mm], the scanning characteristic of each imaging optical system according to the present exemplary embodiment is represented by the following expression (22).

$$Y = =K \times \theta + P \times \theta^3 \qquad (22)$$

The light collection position Y indicates not a position in the absolute coordinate system xyz but a position in the local coordinate system XYZ. That is, the light collection position Y of the first beam indicates the distance from an intersection 711 of an optical axis 610 of the first imaging optical system 61 and the scanned surface 7. The light collection position Y of the second beam indicates the distance from an intersection 713 of an optical axis 620 of the second imaging optical system 62 and the scanned surface 7.

Further, the imaging coefficient K is a coefficient (a Kθ coefficient) corresponding to f in the fθ characteristic: Y=fθ, which is a scanning characteristic in a case where a parallel beam is incident on each imaging optical system, and is a coefficient for expanding the fθ characteristic to a beam other than a parallel beam. That is, the imaging coefficient K is a coefficient for obtaining a proportional relationship between the light collection position Y and the scanning angle θ in a case where a beam having various degrees of convergence including a parallel beam is incident on each imaging optical system. In the present exemplary embodiment, a parallel beam is incident on each imaging optical system. Thus, the imaging coefficient K is equal to the focal length on the optical axis of each imaging optical system.

In expression (22), P is a coefficient (a scanning characteristic coefficient) for determining the scanning characteristic of each of the first and second imaging optical systems 61 and 62 according to the present exemplary embodiment. As illustrated in table 1, P=9 in the present exemplary embodiment. For example, when P=0, expression (22) is represented as Y=Kθ and corresponds to the fθ characteristic. However, when P≠0, expression (22) corresponds to a scanning characteristic in which there is no proportional relationship between the light collection position Y and the scanning angle θ.

If expression (22) is differentiated by the scanning angle θ, then as indicated in the following expression (23), a scanning speed for the scanning angle θ of the beam on the scanned surface 7 is obtained.

$$dY/d\theta = K + 3P \times \theta^2 \quad (23)$$

Further, if expression (23) is divided by a speed $dY(0)/d\theta = K$ at the on-axis image height, the following expression (24) is obtained.

$$(dY/d\theta)/K = 1 + 3P \times \theta^2/K \quad (24)$$

Expression (24) represents the amount of shift in constant-velocity properties at each off-axis image height from the on-axis image height, i.e., the amount of shift in the partial magnification (the partial magnification shift) at the off-axis image height relative to the partial magnification at the on-axis image height. The optical scanning device 110 according to the present exemplary embodiment has a partial magnification. Thus, if P≠0, the scanning speed of the beam is different between the on-axis image height and the off-axis image height. That is, the scanning position (the scanning distance per unit time) at the off-axis image height is elongated according to the partial magnification shift. Thus, if the scanned surface 7 is optically scanned without considering this partial magnification shift, this causes the deterioration of an image to be formed on the scanned surface 7 (the deterioration of the printing performance).

In response, in the present exemplary embodiment, if P≠0, a control unit (not illustrated) controls the light emission of the light source 1, specifically, controls the modulation timing (the light emission timing) and the modulation time (the light emission time) of the light source 1, according to the partial magnification shift. Consequently, it is possible to electrically correct the scanning position and the scanning time on the scanned surface 7. Thus, it is possible to correct the partial magnification shift and the deterioration of an image and therefore obtain excellent printing performance similarly to a case where the fθ characteristic is satisfied.

Table 6 illustrates the determination result of whether the optical scanning device 110 according to the present exemplary embodiment satisfies each of the above conditional expressions. The optical scanning device 110 satisfies all the above conditional expressions regarding the first and second conditions. Further, although the optical scanning device 110 does not have sub-scanning oblique incidence systems, the optical scanning device 110 satisfies conditional expression (20) and therefore satisfies the third condition.

TABLE 6

| Specifications | |
| --- | --- |
| | Value |
| α1 [°] | 122 |
| ρ1 [°] | 88 |
| N | 4 |
| J | 3 |
| ω0 [°] | 45 |
| ω1$_{max}$ [°] | 57.6 |
| ω1$_{min}$ [°] | −4.29 |

| Conditional Expressions | | |
| --- | --- | --- |
| | Right side | Determination |
| α1 > (ρ1 − ω0) × 2 − ω1$_{min}$ (9) | 90.29 | OK |
| α1 < (ρ1 + ω0) × 2 − ω1$_{max}$ (10) | 208.40 | OK |
| α1 > ω1$_{max}$ (11) | 57.60 | OK |

TABLE 6-continued

| Specifications | | |
| --- | --- | --- |
| α1 > −2 × (ρ1 + ω0) + 2 × 360°/N × (J − 1) − ω1$_{min}$ (13) | 98.29 | OK |
| α1 < −2 × (ρ1 − ω0) + 2 × 360°/N × (J − 1) − ω1$_{max}$ (15) | 216.40 | OK |
| α1 < −ω1$_{max}$ + 360°/N × (J − 1) (16) | 122.40 | OK |
| α1 > (2 × 360°/N × (J − 1) − ω1$_{min}$/3 (20) | 121.43 | OK |
| α1 < (2 × 360°/N × (J − 1) − ω1$_{max}$/3 (21) | 100.80 | NG |

Based on the above, the optical scanning device 110 according to the present exemplary embodiment can form an excellent image, even with a small-sized and simple configuration, by reducing the shifts in the incident positions of beams at the boundary between two printing areas when a cascade scanning method is employed. Further, in the present exemplary embodiment, a configuration is employed in which optical members are unified. Thus, it is possible to reduce the number of components as compared with a conventional configuration and achieve the further downsizing and simplification of the entire apparatus.

An optical scanning device 120 according to a fourth exemplary embodiment of the present invention will now be described. In the optical scanning device 120 according to the present exemplary embodiment, components equivalent to those of the optical scanning device 110 according to the third exemplary embodiment are not described.

Figure 8:
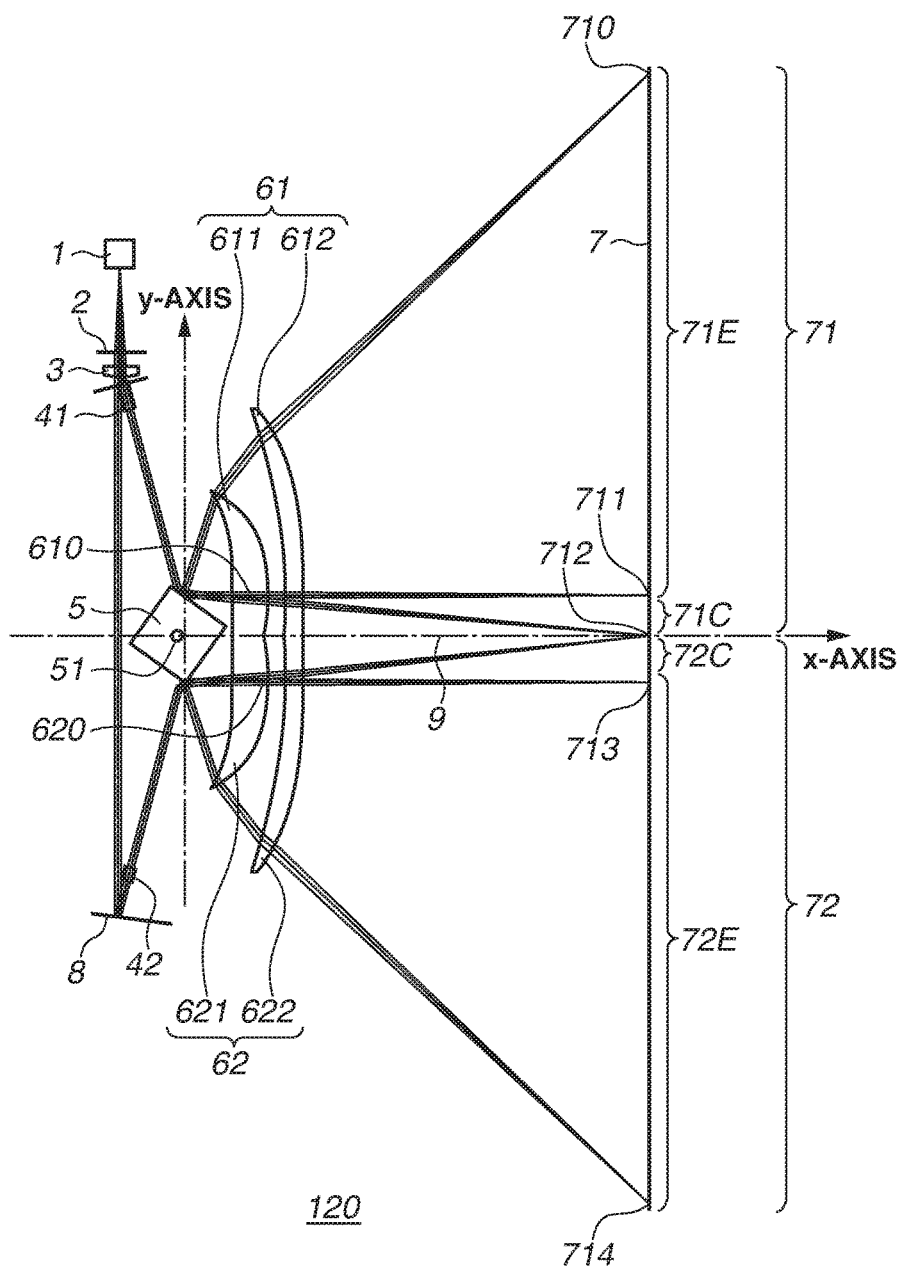
FIG. 8 is a schematic diagram of a main part of an optical scanning device according to a fourth exemplary embodiment of the present invention.

FIG. 8 is a schematic diagram of a main part of the optical scanning device 120 according to the present exemplary embodiment. The optical scanning device 120 according to the present exemplary embodiment is different from the optical scanning device 110 according to the third exemplary embodiment in that each of first and second imaging optical systems 61 and 62 includes a plurality of imaging elements. Further, the optical scanning device 120 is also different from the optical scanning device 110 in each design value, and the scanning viewing angle of the optical scanning device 120 is greater than the scanning viewing angle of the optical scanning device 110.

Tables 7 to 11 illustrate an example of the design of the optical scanning device 120 according to the present exemplary embodiment. In the present exemplary embodiment, sub-scanning incident angles β1 and β2 are both 1.50°.

TABLE 7

| Common Specifications | | |
| --- | --- | --- |
| | | Value |
| Wavelength [nm] of light source | | 790 |
| Refractive index of coupling lens | | 1.576 |
| Refractive index of separation element | | 2.000 |
| Refractive index of imaging element | | 1.524 |
| Coordinates [mm] of rotational axis of deflector | x-coordinate | −0.804 |
| | y-coordinate | 0.000 |
| Imaging coefficient K | | 73.26 |
| Scanning characteristic coefficient P | | 4 |
| Radius Rd [mm] of circumcircle of deflector | | 10 |
| Number of surfaces of deflector | | 4 |
| Width [mm] of effective area | | 216.6 |

TABLE 8

| Specifications of First Optical System | | |
|---|---|---|
| | | Value |
| Diaphragm: width [mm] of oval aperture | Main scanning | 1.080 |
| | Sub-scanning | 1.720 |
| Outside scanning viewing angle [°] | | 72.0 |
| Inside scanning viewing angle [°] | | −6.45 |
| Outside printing area Ye [mm] | | 100.0 |
| Inside printing area Yc [mm] | | 8.296 |
| Angle α1 [°] between first beam and x-axis | | 105 |
| Lx [mm] | | 0.804 |

| Arrangement of First Optical System | | | | | | | |
|---|---|---|---|---|---|---|---|
| | | Origin of each plane | | | Direction of optical axis (in direction cosine) | | |
| [mm] | | x-coordinate | y-coordinate | z-coordinate | x-component | y-component | z-component |
| Light source | | −11.400 | 72.602 | −1.093 | 0.000 | 1.000 | 0.000 |
| Coupling lens | Incidence surface | −11.400 | 54.602 | −1.093 | 0.000 | 1.000 | 0.000 |
| | Exit surface | −11.400 | 52.602 | −1.093 | 0.000 | 1.000 | 0.000 |
| Diaphragm | | −10.800 | 50.602 | −1.093 | 0.000 | 1.000 | 0.000 |
| Separation element | Incidence surface | −10.800 | 48.602 | −1.093 | −0.485 | 0.873 | −0.049 |
| | Exit surface | −9.506 | 43.774 | −0.962 | −0.259 | 0.966 | −0.026 |
| Deflector | | 3.501 | 5.610 | 0.000 | 0.609 | 0.793 | 0.000 |
| Imaging element 611 | Incidence surface | 10.000 | 8.296 | 0.000 | 1.000 | 0.000 | 0.000 |
| | Exit surface | 16.900 | 8.296 | 0.000 | 1.000 | 0.000 | 0.000 |
| Imaging element 612 | Incidence surface | 20.100 | 8.296 | 0.450 | 1.000 | 0.000 | 0.000 |
| | Exit surface | 23.600 | 8.296 | 0.450 | 1.000 | 0.000 | 0.000 |
| Scanned surface | | 89.600 | 8.296 | 0.450 | 1.000 | 0.000 | 0.000 |

TABLE 9

| Aspheric Surfaces of First Optical System | | | | | | | | | |
|---|---|---|---|---|---|---|---|---|---|
| | | Coupling lens | | Separation element | | Imaging element 611 | | Imaging element 612 | |
| | | Incidence surface | Exit surface | Incidence surface | Exit surface | Incidence surface | Exit surface | Incidence surface | Exit surface |
| | | Main Scanning Cross Section | | | | | | | |
| Upper | Ru | 0.00E+00 | −1.11E+01 | 0.00E+00 | 0.00E+00 | 1.44E+02 | −4.17E+01 | −9.65E+01 | −1.69E+02 |
| | ku | 0.00E+00 | 0.00E+00 | 0.00E+00 | 0.00E+00 | −1.71E+03 | 1.61E+00 | −1.76E+00 | −2.03E+01 |
| | B2u | 0.00E+00 | 2.00E−04 | 0.00E+00 | 0.00E+00 | 0.00E+00 | 0.00E+00 | 0.00E+00 | 0.00E+00 |
| | B4u | 0.00E+00 | 0.00E+00 | 0.00E+00 | 0.00E+00 | −6.49E−05 | −2.43E−05 | −2.88E−07 | −3.49E−06 |
| | B6u | 0.00E+00 | 0.00E+00 | 0.00E+00 | 0.00E+00 | 1.74E−07 | −9.15E−09 | 2.18E−10 | 6.54E−10 |
| | B8u | 0.00E+00 | 0.00E+00 | 0.00E+00 | 0.00E+00 | −2.74E−10 | −5.98E−11 | 6.70E−15 | −5.39E−13 |
| | B10u | 0.00E+00 | 0.00E+00 | 0.00E+00 | 0.00E+00 | 2.17E−13 | 8.77E−14 | 0.00E+00 | 0.00E+00 |
| | B12u | 0.00E+00 | 0.00E+00 | 0.00E+00 | 0.00E+00 | −6.16E−17 | −1.10E−18 | 0.00E+00 | 0.00E+00 |
| | B14u | 0.00E+00 | 0.00E+00 | 0.00E+00 | 0.00E+00 | 0.00E+00 | 0.00E+00 | 0.00E+00 | 0.00E+00 |
| | B16u | 0.00E+00 | 0.00E+00 | 0.00E+00 | 0.00E+00 | 0.00E+00 | 0.00E+00 | 0.00E+00 | 0.00E+00 |
| Lower | Rl | 0.00E+00 | −1.11E+01 | 0.00E+00 | 0.00E+00 | 1.44E+02 | −4.17E+01 | −9.65E+01 | −1.69E+02 |
| | kl | 0.00E+00 | 0.00E+00 | 0.00E+00 | 0.00E+00 | −1.71E+03 | 1.61E+00 | −1.76E+00 | −2.03E+01 |
| | B2l | 0.00E+00 | 2.00E−04 | 0.00E+00 | 0.00E+00 | 0.00E+00 | 0.00E+00 | 0.00E+00 | 0.00E+00 |
| | B4l | 0.00E+00 | 0.00E+00 | 0.00E+00 | 0.00E+00 | −6.49E−05 | −2.43E−05 | −2.88E−07 | −3.49E−06 |
| | B6l | 0.00E+00 | 0.00E+00 | 0.00E+00 | 0.00E+00 | 1.74E−07 | −9.15E−09 | 2.18E−10 | 6.54E−10 |
| | B8l | 0.00E+00 | 0.00E+00 | 0.00E+00 | 0.00E+00 | −2.74E−10 | −5.98E−11 | 6.70E−15 | −5.39E−13 |
| | B10l | 0.00E+00 | 0.00E+00 | 0.00E+00 | 0.00E+00 | 2.17E−13 | 8.77E−14 | 0.00E+00 | 0.00E+00 |
| | B12l | 0.00E+00 | 0.00E+00 | 0.00E+00 | 0.00E+00 | −6.16E−17 | −1.10E−18 | 0.00E+00 | 0.00E+00 |
| | B14l | 0.00E+00 | 0.00E+00 | 0.00E+00 | 0.00E+00 | 0.00E+00 | 0.00E+00 | 0.00E+00 | 0.00E+00 |
| | B16l | 0.00E+00 | 0.00E+00 | 0.00E+00 | 0.00E+00 | 0.00E+00 | 0.00E+00 | 0.00E+00 | 0.00E+00 |

TABLE 9-continued

Aspheric Surfaces of First Optical System

| | | Coupling lens | | Separation element | | Imaging element 611 | | Imaging element 612 | |
|---|---|---|---|---|---|---|---|---|---|
| | | Incidence surface | Exit surface | Incidence surface | Exit surface | Incidence surface | Exit surface | Incidence surface | Exit surface |
| | | | | Sub-Scanning Cross Section | | | | | |
| Upper | ru | 0.00E+00 | −1.11E+01 | 0.00E+00 | −3.73E+01 | 1.00E+03 | 7.94E+01 | 1.71E+03 | −7.53E+00 |
| | E2u | 0.00E+00 | 2.00E−04 | 0.00E+00 | 0.00E+00 | 0.00E+00 | 4.01E−04 | −3.37E+06 | 1.82E−03 |
| | E4u | 0.00E+00 | 0.00E+00 | 0.00E+00 | 0.00E+00 | 0.00E+00 | −1.33E−06 | 9.79E+02 | −1.71E−06 |
| | E6u | 0.00E+00 | 0.00E+00 | 0.00E+00 | 0.00E+00 | 0.00E+00 | 1.88E−09 | 0.00E+00 | 1.13E−09 |
| | E8u | 0.00E+00 | 0.00E+00 | 0.00E+00 | 0.00E+00 | 0.00E+00 | −1.23E−12 | 0.00E+00 | −4.03E−13 |
| | E10u | 0.00E+00 | 0.00E+00 | 0.00E+00 | 0.00E+00 | 0.00E+00 | 0.00E+00 | 0.00E+00 | 0.00E+00 |
| | E12u | 0.00E+00 | 0.00E+00 | 0.00E+00 | 0.00E+00 | 0.00E+00 | 0.00E+00 | 0.00E+00 | 0.00E+00 |
| | E14u | 0.00E+00 | 0.00E+00 | 0.00E+00 | 0.00E+00 | 0.00E+00 | 0.00E+00 | 0.00E+00 | 0.00E+00 |
| | E16u | 0.00E+00 | 0.00E+00 | 0.00E+00 | 0.00E+00 | 0.00E+00 | 0.00E+00 | 0.00E+00 | 0.00E+00 |
| Lower | rl | 0.00E+00 | −1.11E+01 | 0.00E+00 | −3.73E+01 | 1.00E+03 | 7.94E+01 | 1.71E+03 | −7.53E+00 |
| | E2l | 0.00E+00 | 2.00E−04 | 0.00E+00 | 0.00E+00 | 0.00E+00 | 4.01E−04 | 3.37E+06 | 1.82E−03 |
| | E4l | 0.00E+00 | 0.00E+00 | 0.00E+00 | 0.00E+00 | 0.00E+00 | −1.33E−06 | 9.79E+02 | −1.71E−06 |
| | E6l | 0.00E+00 | 0.00E+00 | 0.00E+00 | 0.00E+00 | 0.00E+00 | 1.88E−09 | 0.00E+00 | 1.13E−09 |
| | E8l | 0.00E+00 | 0.00E+00 | 0.00E+00 | 0.00E+00 | 0.00E+00 | −1.23E−12 | 0.00E+00 | −4.03E−13 |
| | E10l | 0.00E+00 | 0.00E+00 | 0.00E+00 | 0.00E+00 | 0.00E+00 | 0.00E+00 | 0.00E+00 | 0.00E+00 |
| | E12l | 0.00E+00 | 0.00E+00 | 0.00E+00 | 0.00E+00 | 0.00E+00 | 0.00E+00 | 0.00E+00 | 0.00E+00 |
| | E14l | 0.00E+00 | 0.00E+00 | 0.00E+00 | 0.00E+00 | 0.00E+00 | 0.00E+00 | 0.00E+00 | 0.00E+00 |
| | E16l | 0.00E+00 | 0.00E+00 | 0.00E+00 | 0.00E+00 | 0.00E+00 | 0.00E+00 | 0.00E+00 | 0.00E+00 |
| Odd number term | E1 | 0.00E+00 | 0.00E+00 | 0.00E+00 | 0.00E+00 | 0.00E+00 | −6.57E−03 | −9.25E+06 | 2.26E−02 |
| Tilt term | m0_1u | 0.00E+00 | 0.00E+00 | 0.00E+00 | 0.00E+00 | 0.00E+00 | 0.00E+00 | 4.03E−02 | −1.07E−02 |
| | m0_1l | 0.00E+00 | 0.00E+00 | 0.00E+00 | 0.00E+00 | 0.00E+00 | 0.00E+00 | 4.03E−02 | −1.07E−02 |
| | m2_1u | 0.00E+00 | 0.00E+00 | 0.00E+00 | 0.00E+00 | 0.00E+00 | 0.00E+00 | 5.46E−05 | 2.13E−05 |
| | m2_2l | 0.00E+00 | 0.00E+00 | 0.00E+00 | 0.00E+00 | 0.00E+00 | 0.00E+00 | 5.46E−05 | 2.13E−05 |
| | m4_1u | 0.00E+00 | 0.00E+00 | 0.00E+00 | 0.00E+00 | 0.00E+00 | 0.00E+00 | −1.49E−08 | 4.73E−10 |
| | m4_1l | 0.00E+00 | 0.00E+00 | 0.00E+00 | 0.00E+00 | 0.00E+00 | 0.00E+00 | −1.49E−08 | 4.73E−10 |
| | m0_4u | 0.00E+00 | 0.00E+00 | 0.00E+00 | 0.00E+00 | 0.00E+00 | 0.00E+00 | 1.39E−03 | 1.91E−03 |
| | m0_4l | 0.00E+00 | 0.00E+00 | 0.00E+00 | 0.00E+00 | 0.00E+00 | 0.00E+00 | 1.39E−03 | 1.91E−03 |
| | m1_l | 0.00E+00 | 0.00E+00 | 0.00E+00 | 0.00E+00 | 0.00E+00 | 0.00E+00 | −5.10E−04 | 1.31E−03 |

TABLE 10

Specifications of Second Optical System

| | | Value |
|---|---|---|
| Diaphragm: width [mm] of oval aperture | Main scanning | 1.200 |
| | Sub-scanning | 1.720 |
| Inside scanning viewing angle [°] | | 6.45 |
| Outside scanning viewing angle [°] | | −72.0 |
| Inside printing area Yc [mm] | | 8.296 |
| Outside printing area Ye [mm] | | 100.0 |
| Angle α2 [°] between second beam and x-axis | | −105 |
| Lx [mm] | | 0.804 |

Arrangement of Second Optical System

| | | Origin of each plane | | | Direction of optical axis (in direction cosine) | | |
|---|---|---|---|---|---|---|---|
| [mm] | | x-coordinate | y-coordinate | z-coordinate | x-component | y-component | z-component |
| Light source | | −11.400 | 72.602 | −1.093 | 0.000 | 1.000 | 0.000 |
| Coupling lens | Incidence surface | −11.400 | 54.602 | −1.093 | 0.000 | 1.000 | 0.000 |
| | Exit surface | −11.400 | 52.602 | −1.093 | 0.000 | 1.000 | 0.000 |
| Diaphragm | | −12.000 | 50.602 | −1.093 | 0.000 | 1.000 | 0.000 |
| Reflection element | | −12.000 | −53.081 | −1.214 | −0.130 | −0.991 | −0.013 |

TABLE 10-continued

| | | | | | | | |
|---|---|---|---|---|---|---|---|
| Cylinder lens | Incidence surface | −10.153 | −46.188 | −1.027 | −0.259 | −0.966 | −0.026 |
| | Exit surface | −9.506 | −43.774 | −0.962 | −0.259 | −0.966 | −0.026 |
| Deflector | | 3.501 | −5.610 | 0.000 | 0.609 | −0.793 | 0.000 |
| Imaging element 621 | Incidence surface | 10.000 | −8.296 | 0.000 | 1.000 | 0.000 | 0.000 |
| | Exit surface | 16.900 | −8.296 | 0.000 | 1.000 | 0.000 | 0.000 |
| Imaging element 622 | Incidence surface | 20.100 | −8.296 | 0.450 | 1.000 | 0.000 | 0.000 |
| | Exit surface | 23.600 | −8.296 | 0.450 | 1.000 | 0.000 | 0.000 |
| Scanned surface | | 89.600 | −8.296 | 0.450 | 1.000 | 0.000 | 0.000 |

TABLE 11

Aspheric Surfaces of Second Optical System

Main Scanning Cross Section

| | | Coupling lens | | Separation element | | Imaging element 621 | | Imaging element 622 | |
|---|---|---|---|---|---|---|---|---|---|
| | | Incidence surface | Exit surface | Incidence surface | Exit surface | Incidence surface | Exit surface | Incidence surface | Exit surface |
| Upper | Ru | 0.00E+00 | −1.11E+01 | 0.00E+00 | 0.00E+00 | 1.44E+02 | −4.17E+01 | −9.65E+01 | −1.69E+02 |
| | ku | 0.00E+00 | 0.00E+00 | 0.00E+00 | 0.00E+00 | −1.71E+03 | 1.61E+00 | −1.76E+00 | −2.03E+01 |
| | B2u | 0.00E+00 | 2.00E−04 | 0.00E+00 | 0.00E+00 | 0.00E+00 | 0.00E+00 | 0.00E+00 | 0.00E+00 |
| | B4u | 0.00E+00 | 0.00E+00 | 0.00E+00 | 0.00E+00 | −6.49E−05 | −2.43E−05 | −2.88E−07 | −3.49E−06 |
| | B6u | 0.00E+00 | 0.00E+00 | 0.00E+00 | 0.00E+00 | 1.74E−07 | −9.15E−09 | 2.18E−10 | 6.54E−10 |
| | B8u | 0.00E+00 | 0.00E+00 | 0.00E+00 | 0.00E+00 | −2.74E−10 | −5.98E−11 | 6.70E−15 | −5.39E−13 |
| | B10u | 0.00E+00 | 0.00E+00 | 0.00E+00 | 0.00E+00 | 2.17E−13 | 8.77E−14 | 0.00E+00 | 0.00E+00 |
| | B12u | 0.00E+00 | 0.00E+00 | 0.00E+00 | 0.00E+00 | −6.16E−17 | −1.10E−18 | 0.00E+00 | 0.00E+00 |
| | B14u | 0.00E+00 | 0.00E+00 | 0.00E+00 | 0.00E+00 | 0.00E+00 | 0.00E+00 | 0.00E+00 | 0.00E+00 |
| | B16u | 0.00E+00 | 0.00E+00 | 0.00E+00 | 0.00E+00 | 0.00E+00 | 0.00E+00 | 0.00E+00 | 0.00E+00 |
| Lower | Rl | 0.00E+00 | −1.11E+01 | 0.00E+00 | 0.00E+00 | 1.44E+02 | −4.17E+01 | −9.65E+01 | −1.69E+02 |
| | kl | 0.00E+00 | 2.00E−04 | 0.00E+00 | 0.00E+00 | −1.71E+03 | 1.61E+00 | −1.76E+00 | −2.03E−01 |
| | B2l | 0.00E+00 | 0.00E+00 | 0.00E+00 | 0.00E+00 | 0.00E+00 | 0.00E+00 | 0.00E+00 | 0.00E+00 |
| | B4l | 0.00E+00 | 0.00E+00 | 0.00E+00 | 0.00E+00 | −6.49E−05 | −2.43E−05 | −2.88E−07 | −3.49E−06 |
| | B6l | 0.00E+00 | 0.00E+00 | 0.00E+00 | 0.00E+00 | 1.74E−07 | −9.15E−09 | 2.18E−10 | 6.54E−10 |
| | B8l | 0.00E+00 | 0.00E+00 | 0.00E+00 | 0.00E+00 | −2.74E−10 | −5.98E−11 | 6.70E−15 | −5.39E−13 |
| | B10l | 0.00E+00 | 0.00E+00 | 0.00E+00 | 0.00E+00 | 2.17E−13 | 8.77E−14 | 0.00E+00 | 0.00E+00 |
| | B12l | 0.00E+00 | 0.00E+00 | 0.00E+00 | 0.00E+00 | −6.16E−17 | −1.10E−18 | 0.00E+00 | 0.00E+00 |
| | B14l | 0.00E+00 | 0.00E+00 | 0.00E+00 | 0.00E+00 | 0.00E+00 | 0.00E+00 | 0.00E+00 | 0.00E+00 |
| | B16l | 0.00E+00 | 0.00E+00 | 0.00E+00 | 0.00E+00 | 0.00E+00 | 0.00E+00 | 0.00E+00 | 0.00E+00 |

Sub-Scanning Cross Section

| | | Coupling lens | | Cylinder lens | | Imaging element 621 | | Imaging element 622 | |
|---|---|---|---|---|---|---|---|---|---|
| | | Incidence surface | Exit surface | Incidence surface | Exit surface | Incidence surface | Exit surface | Incidence surface | Exit surface |
| Upper | ru | 0.00E+00 | −1.11E+01 | 0.00E+00 | −3.73E+01 | 1.00E+03 | 7.94E+01 | 1.71E+03 | −7.53E+00 |
| | E2u | 0.00E+00 | 2.00E−04 | 0.00E+00 | 0.00E+00 | 0.00E+00 | 4.01E−04 | −3.37E−06 | 1.82E−03 |
| | E4u | 0.00E+00 | 0.00E+00 | 0.00E+00 | 0.00E+00 | 0.00E+00 | −1.33E−06 | 9.79E+02 | −1.71E−06 |
| | E6u | 0.00E+00 | 0.00E+00 | 0.00E+00 | 0.00E+00 | 0.00E+00 | 1.88E−09 | 0.00E+00 | 1.13E−09 |
| | E8u | 0.00E+00 | 0.00E+00 | 0.00E+00 | 0.00E+00 | 0.00E+00 | −1.23E−12 | 0.00E+00 | −4.03E−13 |
| | E10u | 0.00E+00 | 0.00E+00 | 0.00E+00 | 0.00E+00 | 0.00E+00 | 0.00E+00 | 0.00E+00 | 0.00E+00 |
| | E12u | 0.00E+00 | 0.00E+00 | 0.00E+00 | 0.00E+00 | 0.00E+00 | 0.00E+00 | 0.00E+00 | 0.00E+00 |
| | E14u | 0.00E+00 | 0.00E+00 | 0.00E+00 | 0.00E+00 | 0.00E+00 | 0.00E+00 | 0.00E+00 | 0.00E+00 |
| | E16u | 0.00E+00 | 0.00E+00 | 0.00E+00 | 0.00E+00 | 0.00E+00 | 0.00E+00 | 0.00E+00 | 0.00E+00 |
| Lower | rl | 0.00E+00 | −1.11E+01 | 0.00E+00 | −3.73E+01 | 1.00E+03 | 7.94E+01 | 1.71E+03 | −7.53E+00 |
| | E2l | 0.00E+00 | 2.00E−04 | 0.00E+00 | 0.00E+00 | 0.00E+00 | 4.01E−04 | −3.37E−06 | 1.82E−03 |
| | E4l | 0.00E+00 | 0.00E+00 | 0.00E+00 | 0.00E+00 | 0.00E+00 | −1.33E−06 | 9.79E+02 | −1.71E−06 |
| | E6l | 0.00E+00 | 0.00E+00 | 0.00E+00 | 0.00E+00 | 0.00E+00 | 1.88E−09 | 0.00E+00 | 1.13E−09 |
| | E8l | 0.00E+00 | 0.00E+00 | 0.00E+00 | 0.00E+00 | 0.00E+00 | −1.23E−12 | 0.00E+00 | −4.03E−13 |
| | E10l | 0.00E+00 | 0.00E+00 | 0.00E+00 | 0.00E+00 | 0.00E+00 | 0.00E+00 | 0.00E+00 | 0.00E+00 |
| | E12l | 0.00E+00 | 0.00E+00 | 0.00E+00 | 0.00E+00 | 0.00E+00 | 0.00E+00 | 0.00E+00 | 0.00E+00 |
| | E14l | 0.00E+00 | 0.00E+00 | 0.00E+00 | 0.00E+00 | 0.00E+00 | 0.00E+00 | 0.00E+00 | 0.00E+00 |
| | E16l | 0.00E+00 | 0.00E+00 | 0.00E+00 | 0.00E+00 | 0.00E+00 | 0.00E+00 | 0.00E+00 | 0.00E+00 |

TABLE 11-continued

| | | | | | | | | | |
|---|---|---|---|---|---|---|---|---|---|
| Aspheric Surfaces of Second Optical System | | | | | | | | | |
| Odd number term | E1 | 0.00E+00 | 0.00E+00 | 0.00E+00 | 0.00E+00 | 0.00E+00 | 6.57E−03 | 9.25E+06 | −2.26E−02 |
| Tilt term | m0_1u | 0.00E+00 | 0.00E+00 | 0.00E+00 | 0.00E+00 | 0.00E+00 | 0.00E+00 | 4.03E−02 | −1.07E−02 |
| | m0_1l | 0.00E+00 | 0.00E+00 | 0.00E+00 | 0.00E+00 | 0.00E+00 | 0.00E+00 | 4.03E−02 | −1.07E−02 |
| | m2_1u | 0.00E+00 | 0.00E+00 | 0.00E+00 | 0.00E+00 | 0.00E+00 | 0.00E+00 | 5.46E−05 | 2.13E−05 |
| | m2_2l | 0.00E+00 | 0.00E+00 | 0.00E+00 | 0.00E+00 | 0.00E+00 | 0.00E+00 | 5.46E−05 | 2.13E−05 |
| | m4_1u | 0.00E+00 | 0.00E+00 | 0.00E+00 | 0.00E+00 | 0.00E+00 | 0.00E+00 | −1.49E−08 | 4.73E−10 |
| | m4_1l | 0.00E+00 | 0.00E+00 | 0.00E+00 | 0.00E+00 | 0.00E+00 | 0.00E+00 | −1.49E−08 | 4.73E−10 |
| | m0_4u | 0.00E+00 | 0.00E+00 | 0.00E+00 | 0.00E+00 | 0.00E+00 | 0.00E+00 | 1.39E−03 | 1.91E−03 |
| | m0_4l | 0.00E+00 | 0.00E+00 | 0.00E+00 | 0.00E+00 | 0.00E+00 | 0.00E+00 | 1.39E−03 | 1.91E−03 |
| | m1_l | 0.00E+00 | 0.00E+00 | 0.00E+00 | 0.00E+00 | 0.00E+00 | 0.00E+00 | 5.10E−04 | −1.31E−03 |

The optical scanning device 120 according to the present exemplary embodiment employs a configuration in which the scanning viewing angle is greater than that of the optical scanning device 110 according to the third exemplary embodiment. Thus, it is possible to achieve downsizing by further shortening the optical path length in the optical axis direction. In the configuration in which the scanning viewing angle is thus great, the shifts in the incident positions of beams at the boundary between two printing areas caused by the positional shift in the scanned surface 7 are conspicuous. Thus, the effects obtained by satisfying the above conditional expression (4) are particularly great.

Table 12 indicates the determination result of whether the optical scanning device 120 according to the present exemplary embodiment satisfies each of the above conditional expressions. The optical scanning device 120 satisfies all the above conditional expressions regarding the first and second conditions. Further, although the optical scanning device 120 does not satisfy either of conditional expressions (20) and (21), the optical scanning device 120 has sub-scanning oblique incidence systems ($\beta 1 \neq 0$, $\beta 2 \neq 0$) as illustrated in tables 7 and 9 and therefore satisfies the third condition.

TABLE 12

| Specifications | |
|---|---|
| | Value |
| $\alpha 1$ [°] | 105 |
| $\rho 1$ [°] | 88 |
| N | 4 |
| J | 3 |
| $\omega 0$ [°] | 45 |
| $\omega 1_{max}$ [°] | 72 |
| $\omega 1_{min}$ [°] | −6.45 |

| Conditional Expressions | | |
|---|---|---|
| | Right side | Determination |
| $\alpha 1 > (\rho 1 - \omega 0) \times 2 - \omega 1_{min}$ (9) | 92.45 | OK |
| $\alpha 1 < (\rho 1 + \omega 0) \times 2 - \omega 1_{max}$ (10) | 194.00 | OK |
| $\alpha 1 > \omega 1_{max}$ (11) | 72.00 | OK |
| $\alpha 1 > -2 \times (\rho 1 + \omega 0) + 2 \times 360°/N \times (J - 1) - \omega 1_{min}$ (13) | 100.45 | OK |
| $\alpha 1 < -2 \times (\rho 1 - \omega 0) + 2 \times 360°/N \times (J - 1) - \omega 1_{max}$ (15) | 202.00 | OK |

TABLE 12-continued

| Specifications | | |
|---|---|---|
| $\alpha 1 < -\omega 1_{max} + 360°/N \times (J - 1)$ (16) | 108.00 | OK |
| $\alpha 1 > (2 \times 360°/N \times (J - 1) - \omega 1_{min}/3$ (20) | 122.15 | NG |
| $\alpha 1 < (2 \times 360°/N \times (J - 1) - \omega 1_{max}/3$ (21) | 96.00 | NG |

An optical scanning device 130 according to a fifth exemplary embodiment of the present invention is described below. In the optical scanning device 130 according to the present exemplary embodiment, components equivalent to those of the optical scanning devices 110 and 120 according to the third and fourth exemplary embodiments are not described.

Figure 9:
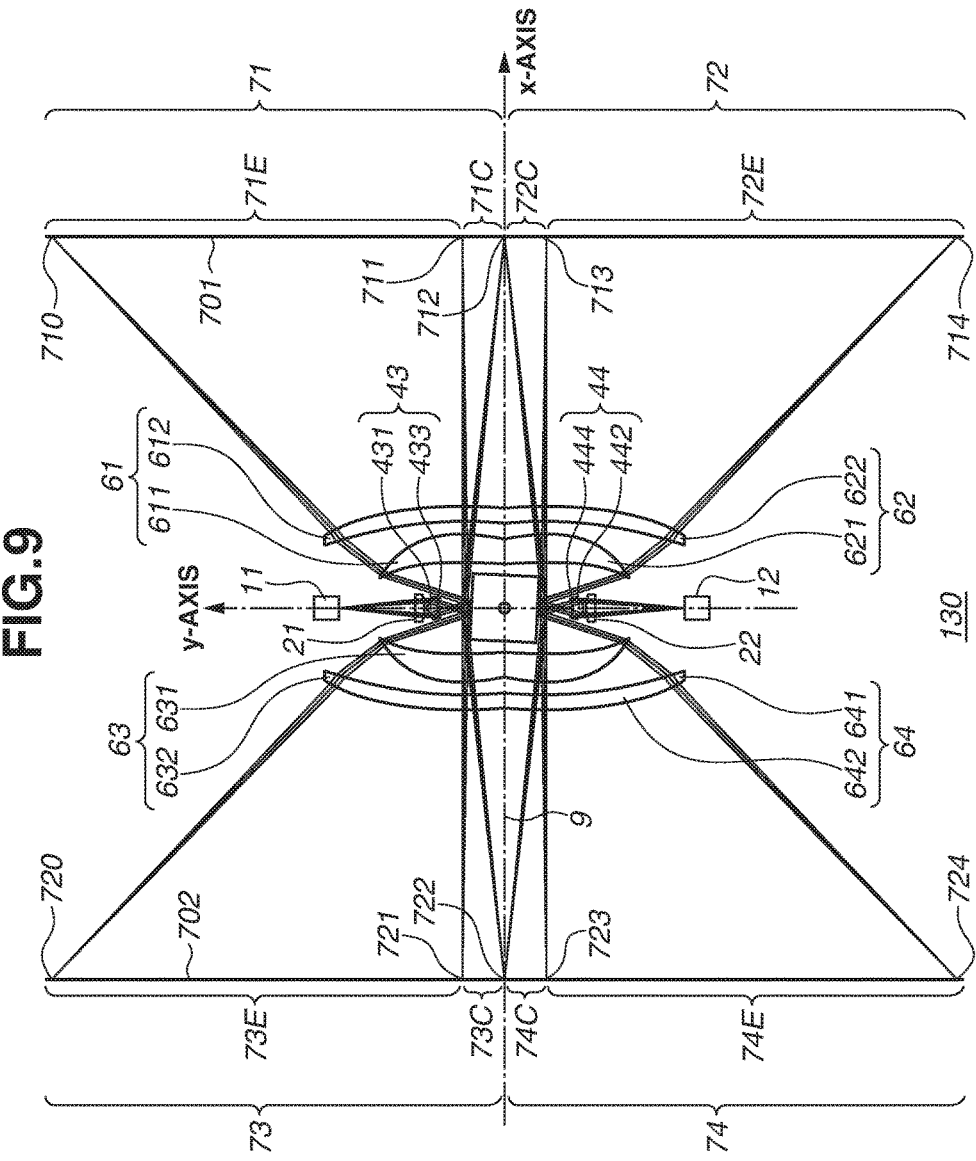
FIG. 9 is a schematic diagram of a main part of an optical scanning device according to a fifth exemplary embodiment of the present invention.
Figure 10:
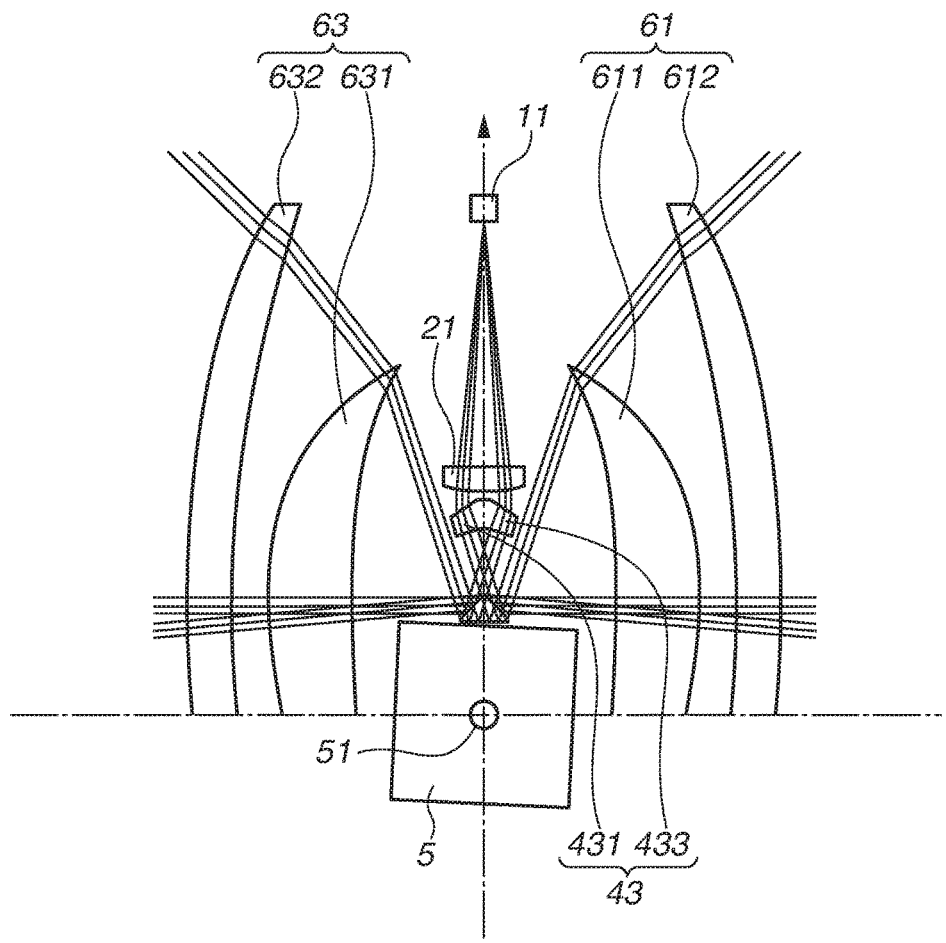
FIG. 10 is a partial enlarged view of the optical scanning device according to the fifth exemplary embodiment.

FIG. 9 is a schematic diagram of a main part of the optical scanning device 130 according to the present exemplary embodiment. FIG. 10 is obtained by enlarging a part of FIG. 9. The optical scanning device 130 according to the present exemplary embodiment is different from the optical scanning device 120 according to the fourth exemplary embodiment in that the optical scanning device 130 includes two light sources and four imaging optical systems and performs cascade scanning on two scanned surfaces using a common deflector 5. The optical scanning device 130 includes first and second light sources 11 and 12, first and second diaphragms (not illustrated), first and second coupling lenses 21 and 22, first and second separation elements 43 and 44, a deflector 5, and first to fourth imaging optical systems 61, 62, 63, and 64.

Tables 13 to 19 illustrate an example of the design of the optical scanning device 130 according to the present exemplary embodiment. In each table, the optical members in the optical path from the first light source 11 to a first area 71 correspond to a first optical system, and the optical members in the optical path from the second light source 12 to a second area 72 correspond to a second optical system. Further, the optical members in the optical path from the first light source 11 to a seventh area 73 correspond to a third optical system, and the optical members in the optical path from the second light source 12 to an eighth area 74 correspond to a fourth optical system. Similarly to the other described embodiments the seventh area 73 is considered separately as two areas, namely areas 73E and 73C (ninth and tenth areas respectively). Similarly, the eighth area 74 is considered separately as two areas, namely areas 74E and 74C (eleventh and twelfth areas respectively)°

TABLE 13

Common Specifications

| | | Value |
|---|---|---|
| Wavelength [nm] of light source | | 790 |
| Refractive index of coupling lens | | 1.576 |
| Refractive index of separation element | | 2.000 |
| Refractive index of imaging element | | 1.524 |
| Coordinates [mm] of rotational axis of deflector | x-coordinate | 0.000 |
| | y-coordinate | 0.000 |
| Imaging coefficient K | | 73.26 |
| Scanning characteristic coefficient P | | 4 |
| Radius Rd [mm] of circumcircle of deflector | | 10 |
| Number of surfaces of deflector | | 4 |
| Width [mm] of effective area | | 216.6 |

TABLE 14

Specifications of First Optical System: First Beam

| | Value |
|---|---|
| Diaphragm: width [mm] of oval aperture — Main scanning | 1.060 |
| Diaphragm: width [mm] of oval aperture — Sub-scanning | 0.320 |
| Outside scanning viewing angle [°] | 72.0 |
| Inside scanning viewing angle [°] | −6.55 |
| Outside printing area Ye [mm] | 100.0 |
| Inside printing area Yc [mm] | 8.296 |
| Angle α1 [°] between first beam and x-axis | 107.2 |
| Lx [mm] | 0.487 |

Arrangement of First Optical System: First Beam

| [mm] | | Origin of each plane x-coordinate | Origin of each plane y-coordinate | Origin of each plane z-coordinate | Direction of optical axis (in direction cosine) x-component | Direction of optical axis (in direction cosine) y-component | Direction of optical axis (in direction cosine) z-component |
|---|---|---|---|---|---|---|---|
| Light source | | 0.000 | 40.461 | −0.220 | 0.000 | 1.000 | 0.000 |
| Coupling lens | Incidence surface | 0.000 | 22.461 | −0.220 | 0.000 | 1.000 | 0.000 |
| | Exit surface | 0.000 | 20.461 | −0.220 | 0.000 | 1.000 | 0.000 |
| Diaphragm | | −2.000 | 18.461 | −0.220 | 0.000 | 1.000 | 0.000 |
| Separation element | Incidence surface | −2.000 | 16.461 | −0.220 | −0.544 | 0.838 | −0.048 |
| | Exit surface | −1.409 | 14.551 | −0.168 | 0.296 | 0.955 | −0.026 |
| Deflector | | 4.196 | 5.691 | 0.000 | 0.593 | 0.805 | 0.000 |
| Imaging element 611 | Incidence surface | 10.487 | 8.426 | 0.000 | 1.000 | 0.000 | 0.000 |
| | Exit surface | 17.387 | 8.426 | 0.000 | 1.000 | 0.000 | 0.000 |
| Imaging element 612 | Incidence surface | 20.587 | 8.426 | 0.450 | 1.000 | 0.000 | 0.000 |
| | Exit surface | 24.087 | 8.426 | 0.450 | 1.000 | 0.000 | 0.000 |
| Scanned surface | | 90.087 | 8.426 | 0.450 | 1.000 | 0.000 | 0.000 |

TABLE 15

Aspheric Surfaces of First Optical System

| | | Coupling lens Incidence surface | Coupling lens Exit surface | Separation element Incidence surface | Separation element Exit surface | Imaging element 611 Incidence surface | Imaging element 611 Exit surface | Imaging element 612 Incidence surface | Imaging element 612 Exit surface |
|---|---|---|---|---|---|---|---|---|---|
| | | | | Main Scanning Cross Section | | | | | |
| Upper | Ru | 0.00E+00 | −1.11E+00 | 0.00E+00 | 0.00E+00 | 1.44E+02 | 4.17E+01 | −9.65E+01 | −1.69E+02 |
| | ku | 0.00E+00 | 0.00E+00 | 0.00E+00 | 0.00E+00 | −1.71E+03 | 1.61E+00 | −1.76E+00 | −2.03E+01 |
| | B2u | 0.00E+00 | 2.00E+00 | 0.00E+00 | 0.00E+00 | 0.00E+00 | 0.00E+00 | 0.00E+00 | 0.00E+00 |

TABLE 15-continued

Aspheric Surfaces of First Optical System

| | | Coupling lens | | Separation element | | Imaging element 611 | | Imaging element 612 | |
|---|---|---|---|---|---|---|---|---|---|
| | | Incidence surface | Exit surface | Incidence surface | Exit surface | Incidence surface | Exit surface | Incidence surface | Exit surface |
| | B4u | 0.00E+00 | 0.00E+00 | 0.00E+00 | 0.00E+00 | −6.49E−05 | −2.43E−05 | −2.88E−07 | −3.49E−06 |
| | B6u | 0.00E+00 | 0.00E+00 | 0.00E+00 | 0.00E+00 | 1.74E−07 | −9.15E−09 | 2.18E−10 | 6.54E−10 |
| | B8u | 0.00E+00 | 0.00E+00 | 0.00E+00 | 0.00E+00 | −2.74E−10 | −5.98E−11 | 6.70E−15 | −5.39E−13 |
| | B10u | 0.00E+00 | 0.00E+00 | 0.00E+00 | 0.00E+00 | 2.17E−13 | 8.77E−14 | 0.00E+00 | 0.00E+00 |
| | B12u | 0.00E+00 | 0.00E+00 | 0.00E+00 | 0.00E+00 | −6.16E−17 | −1.10E−18 | 0.00E+00 | 0.00E+00 |
| | B14u | 0.00E+00 | 0.00E+00 | 0.00E+00 | 0.00E+00 | 0.00E+00 | 0.00E+00 | 0.00E+00 | 0.00E+00 |
| | B16u | 0.00E+00 | 0.00E+00 | 0.00E+00 | 0.00E+00 | 0.00E+00 | 0.00E+00 | 0.00E+00 | 0.00E+00 |
| Lower | Rl | 0.00E+00 | −1.11E+01 | 0.00E+00 | 0.00E+00 | 1.44E+02 | 4.17E+01 | −9.65E+01 | −1.69E+02 |
| | kl | 0.00E+00 | 2.00E−04 | 0.00E+00 | 0.00E+00 | −1.71E+03 | 1.61E+00 | −1.76E+00 | −2.03E+01 |
| | B2l | 0.00E+00 | 0.00E+00 | 0.00E+00 | 0.00E+00 | 0.00E+00 | 0.00E+00 | 0.00E+00 | 0.00E+00 |
| | B4l | 0.00E+00 | 0.00E+00 | 0.00E+00 | 0.00E+00 | −6.49E−05 | −2.43E−05 | −2.88E−07 | −3.49E−06 |
| | B6l | 0.00E+00 | 0.00E+00 | 0.00E+00 | 0.00E+00 | 1.74E−07 | −9.15E−09 | 2.18E−10 | 6.54E−10 |
| | B8l | 0.00E+00 | 0.00E+00 | 0.00E+00 | 0.00E+00 | −2.74E−10 | −5.98E−11 | 6.70E−15 | −5.39E−13 |
| | B10l | 0.00E+00 | 0.00E+00 | 0.00E+00 | 0.00E+00 | 2.17E−13 | 8.77E−14 | 0.00E+00 | 0.00E+00 |
| | B12l | 0.00E+00 | 0.00E+00 | 0.00E+00 | 0.00E+00 | −6.16E−17 | −1.10E−18 | 0.00E+00 | 0.00E+00 |
| | B14l | 0.00E+00 | 0.00E+00 | 0.00E+00 | 0.00E+00 | 0.00E+00 | 0.00E+00 | 0.00E+00 | 0.00E+00 |
| | B16l | 0.00E+00 | 0.00E+00 | 0.00E+00 | 0.00E+00 | 0.00E+00 | 0.00E+00 | 0.00E+00 | 0.00E+00 |
| | | | | Sub-Scanning Cross Section | | | | | |
| Upper | ru | 0.00E+00 | −1.11E+01 | 0.00E+00 | −7.01E+00 | 1.00E+03 | 7.94E+01 | 1.71E+03 | −7.53E+00 |
| | E2u | 0.00E+00 | 2.00E−04 | 0.00E+00 | 0.00E+00 | 0.00E+00 | 4.01E−04 | −3.37E+06 | 1.82E−03 |
| | E4u | 0.00E+00 | 0.00E+00 | 0.00E+00 | 0.00E+00 | 0.00E+00 | −1.33E−06 | 9.79E+02 | −1.71E−06 |
| | E6u | 0.00E+00 | 0.00E+00 | 0.00E+00 | 0.00E+00 | 0.00E+00 | 1.88E−09 | 0.00E+00 | 1.13E−09 |
| | E8u | 0.00E+00 | 0.00E+00 | 0.00E+00 | 0.00E+00 | 0.00E+00 | −1.23E−12 | 0.00E+00 | −4.03E−13 |
| | E10u | 0.00E+00 | 0.00E+00 | 0.00E+00 | 0.00E+00 | 0.00E+00 | 0.00E+00 | 0.00E+00 | 0.00E+00 |
| | E12u | 0.00E+00 | 0.00E+00 | 0.00E+00 | 0.00E+00 | 0.00E+00 | 0.00E+00 | 0.00E+00 | 0.00E+00 |
| | E14u | 0.00E+00 | 0.00E+00 | 0.00E+00 | 0.00E+00 | 0.00E+00 | 0.00E+00 | 0.00E+00 | 0.00E+00 |
| | E16u | 0.00E+00 | 0.00E+00 | 0.00E+00 | 0.00E+00 | 0.00E+00 | 0.00E+00 | 0.00E+00 | 0.00E+00 |
| Lower | rl | 0.00E+00 | −1.11E+01 | 0.00E+00 | −7.01E+00 | 1.00E+03 | 7.94E+01 | 1.71E+03 | −7.53E+00 |
| | E2l | 0.00E+00 | 2.00E−04 | 0.00E+00 | 0.00E+00 | 0.00E+00 | 4.01E−04 | −3.37E+06 | 1.82E−03 |
| | E4l | 0.00E+00 | 0.00E+00 | 0.00E+00 | 0.00E+00 | 0.00E+00 | −1.33E−06 | 9.79E+02 | −1.71E−06 |
| | E6l | 0.00E+00 | 0.00E+00 | 0.00E+00 | 0.00E+00 | 0.00E+00 | 1.88E−09 | 0.00E+00 | 1.13E−09 |
| | E8l | 0.00E+00 | 0.00E+00 | 0.00E+00 | 0.00E+00 | 0.00E+00 | −1.23E−12 | 0.00E+00 | −4.03E−13 |
| | E10l | 0.00E+00 | 0.00E+00 | 0.00E+00 | 0.00E+00 | 0.00E+00 | 0.00E+00 | 0.00E+00 | 0.00E+00 |
| | E12l | 0.00E+00 | 0.00E+00 | 0.00E+00 | 0.00E+00 | 0.00E+00 | 0.00E+00 | 0.00E+00 | 0.00E+00 |
| | E14l | 0.00E+00 | 0.00E+00 | 0.00E+00 | 0.00E+00 | 0.00E+00 | 0.00E+00 | 0.00E+00 | 0.00E+00 |
| | E16l | 0.00E+00 | 0.00E+00 | 0.00E+00 | 0.00E+00 | 0.00E+00 | 0.00E+00 | 0.00E+00 | 0.00E+00 |
| Odd number term | E1 | 0.00E+00 | 0.00E+00 | 0.00E+00 | 0.00E+00 | 0.00E+00 | −6.57E−03 | −9.25E+06 | 2.26E−02 |
| Tilt term | m0_1u | 0.00E+00 | 0.00E+00 | 0.00E+00 | 0.00E+00 | 0.00E+00 | 0.00E+00 | 4.03E−02 | −1.07E−02 |
| | m0_1l | 0.00E+00 | 0.00E+00 | 0.00E+00 | 0.00E+00 | 0.00E+00 | 0.00E+00 | 4.03E−02 | −1.07E−02 |
| | m2_1u | 0.00E+00 | 0.00E+00 | 0.00E+00 | 0.00E+00 | 0.00E+00 | 0.00E+00 | 5.46E−05 | 2.13E−05 |
| | m2_2l | 0.00E+00 | 0.00E+00 | 0.00E+00 | 0.00E+00 | 0.00E+00 | 0.00E+00 | 5.46E−05 | 2.13E−05 |
| | m4_1u | 0.00E+00 | 0.00E+00 | 0.00E+00 | 0.00E+00 | 0.00E+00 | 0.00E+00 | −1.49E−08 | 4.73E−10 |
| | m4_1l | 0.00E+00 | 0.00E+00 | 0.00E+00 | 0.00E+00 | 0.00E+00 | 0.00E+00 | −1.49E−08 | 4.73E−10 |
| | m0_4u | 0.00E+00 | 0.00E+00 | 0.00E+00 | 0.00E+00 | 0.00E+00 | 0.00E+00 | 1.39E−03 | 1.91E−03 |
| | m0_4l | 0.00E+00 | 0.00E+00 | 0.00E+00 | 0.00E+00 | 0.00E+00 | 0.00E+00 | 1.39E−03 | 1.91E−03 |
| | m1_l | 0.00E+00 | 0.00E+00 | 0.00E+00 | 0.00E+00 | 0.00E+00 | 0.00E+00 | −5.10E−04 | 1.31E−03 |

TABLE 16

Specifications of Second Optical System: Second Beam

| | | Value |
|---|---|---|
| Diaphragm: width [mm] of oval aperture | main scanning | 1.060 |
| | sub-scanning | 0.320 |
| Inside scanning viewing angle [°] | | −72.0 |
| Outside scanning viewing angle [°] | | 6.55 |
| Inside printing area Yc [mm] | | 100.0 |
| Outside printing area Ye [mm] | | 8.296 |
| Angle α2 [°] between second beam and x-axis | | −107.2 |
| Lx [mm] | | 0.487 |

TABLE 16-continued

Specifications of Second Optical System: Second Beam

Value

Arrangement of Second Optical System: Second Beam

| [mm] | | Origin of each plane | | | Direction of optical axis (in direction cosine) | | |
|---|---|---|---|---|---|---|---|
| | | x-coordinate | y-coordinate | z-coordinate | x-component | y-component | z-component |
| Light source | | 0.000 | −40.461 | −0.220 | 0.000 | −1.000 | 0.000 |
| Coupling lens | Incidence surface | 0.000 | −22.461 | −0.220 | 0.000 | −1.000 | 0.000 |
| | Exit surface | 0.000 | −20.461 | −0.220 | 0.000 | −1.000 | 0.000 |
| Diaphragm | | −2.000 | −18.461 | −0.220 | 0.000 | −1.000 | 0.000 |
| Separation element | Incidence surface | −2.000 | −16.461 | −0.220 | −0.544 | −0.838 | −0.048 |
| | Exit surface | −1.409 | −14.551 | −0.168 | −0.296 | −0.955 | −0.026 |
| Deflector | | 4.196 | −5.691 | 0.000 | 0.593 | 0.805 | 0.000 |
| Imaging element 621 | Incidence surface | 10.487 | −8.426 | 0.000 | 1.000 | 0.000 | 0.000 |
| | Exit surface | 17.387 | −8.426 | 0.000 | 1.000 | 0.000 | 0.000 |
| Imaging element 622 | Incidence surface | 20.587 | −8.426 | 0.450 | 1.000 | 0.000 | 0.000 |
| | Exit surface | 24.087 | −8.426 | 0.450 | 1.000 | 0.000 | 0.000 |
| Scanned surface | | 90.087 | −8.426 | 0.450 | 1.000 | 0.000 | 0.000 |

TABLE 17

Aspheric Surfaces of Second Optical System

| | | Coupling lens | | Separation element | | Imaging element 621 | | Imaging element 622 | |
|---|---|---|---|---|---|---|---|---|---|
| | | Incidence surface | Exit surface | Incidence surface | Exit surface | Incidence surface | Exit surface | Incidence surface | Exit surface |
| Main Scanning Cross Section | | | | | | | | | |
| Upper | Ru | 0.00E+00 | −1.11E+01 | 0.00E+00 | 0.00E+00 | 1.44E+02 | −4.17E+01 | −9.65E+01 | −1.69E+02 |
| | ku | 0.00E+00 | 0.00E+00 | 0.00E+00 | 0.00E+00 | −1.71E+03 | 1.61E+00 | −1.76E+00 | −2.03E+01 |
| | B2u | 0.00E+00 | 2.00E−04 | 0.00E+00 | 0.00E+00 | 0.00E+00 | 0.00E+00 | 0.00E+00 | 0.00E+00 |
| | B4u | 0.00E+00 | 0.00E+00 | 0.00E+00 | 0.00E+00 | −6.49E−05 | −2.43E−05 | −2.88E−07 | −3.49E−06 |
| | B6u | 0.00E+00 | 0.00E+00 | 0.00E+00 | 0.00E+00 | 1.74E−07 | −9.15E−09 | 2.18E−10 | 6.54E−10 |
| | B8u | 0.00E+00 | 0.00E+00 | 0.00E+00 | 0.00E+00 | −2.74E−10 | −5.98E−11 | 6.70E−15 | −5.39E−13 |
| | B10u | 0.00E+00 | 0.00E+00 | 0.00E+00 | 0.00E+00 | 2.17E−13 | 8.77E−14 | 0.00E+00 | 0.00E+00 |
| | B12u | 0.00E+00 | 0.00E+00 | 0.00E+00 | 0.00E+00 | −6.16E−17 | −1.10E−18 | 0.00E+00 | 0.00E+00 |
| | B14u | 0.00E+00 | 0.00E+00 | 0.00E+00 | 0.00E+00 | 0.00E+00 | 0.00E+00 | 0.00E+00 | 0.00E+00 |
| | B16u | 0.00E+00 | 0.00E+00 | 0.00E+00 | 0.00E+00 | 0.00E+00 | 0.00E+00 | 0.00E+00 | 0.00E+00 |
| Lower | Rl | 0.00E+00 | −1.11E+01 | 0.00E+00 | 0.00E+00 | 1.44E+02 | −4.17E+01 | −9.65E+01 | −1.69E+02 |
| | kl | 0.00E+00 | 2.00E−04 | 0.00E+00 | 0.00E+00 | −1.71E+03 | 1.61E+00 | −1.76E+00 | −2.03E−01 |
| | B2l | 0.00E+00 | 0.00E+00 | 0.00E+00 | 0.00E+00 | 0.00E+00 | 0.00E+00 | 0.00E+00 | 0.00E+00 |
| | B4l | 0.00E+00 | 0.00E+00 | 0.00E+00 | 0.00E+00 | −6.49E−05 | −2.43E−05 | −2.88E−07 | −3.49E−06 |
| | B6l | 0.00E+00 | 0.00E+00 | 0.00E+00 | 0.00E+00 | 1.74E−07 | −9.15E−09 | 2.18E−10 | 6.54E−10 |
| | B8l | 0.00E+00 | 0.00E+00 | 0.00E+00 | 0.00E+00 | −2.74E−10 | −5.98E−11 | 6.70E−15 | −5.39E−13 |
| | B10l | 0.00E+00 | 0.00E+00 | 0.00E+00 | 0.00E+00 | 2.17E−13 | 8.77E−14 | 0.00E+00 | 0.00E+00 |
| | B12l | 0.00E+00 | 0.00E+00 | 0.00E+00 | 0.00E+00 | −6.16E−17 | −1.10E−18 | 0.00E+00 | 0.00E+00 |
| | B14l | 0.00E+00 | 0.00E+00 | 0.00E+00 | 0.00E+00 | 0.00E+00 | 0.00E+00 | 0.00E+00 | 0.00E+00 |
| | B16l | 0.00E+00 | 0.00E+00 | 0.00E+00 | 0.00E+00 | 0.00E+00 | 0.00E+00 | 0.00E+00 | 0.00E+00 |
| Sub-Scanning Cross Section | | | | | | | | | |
| Upper | ru | 0.00E+00 | −1.11E+01 | 0.00E+00 | −7.01E+00 | 1.00E+03 | 7.94E+01 | 1.71E+03 | −7.53E+00 |
| | E2u | 0.00E+00 | 2.00E−04 | 0.00E+00 | 0.00E+00 | 0.00E+00 | 4.01E−04 | −3.37E−06 | 1.82E−03 |
| | E4u | 0.00E+00 | 0.00E+00 | 0.00E+00 | 0.00E+00 | 0.00E+00 | −1.33E−06 | 9.79E+02 | −1.71E−06 |
| | E6u | 0.00E+00 | 0.00E+00 | 0.00E+00 | 0.00E+00 | 0.00E+00 | 1.88E−09 | 0.00E+00 | 1.13E−09 |
| | B8u | 0.00E+00 | 0.00E+00 | 0.00E+00 | 0.00E+00 | 0.00E+00 | −1.23E−12 | 0.00E+00 | −4.03E−13 |
| | E10u | 0.00E+00 | 0.00E+00 | 0.00E+00 | 0.00E+00 | 0.00E+00 | 0.00E+00 | 0.00E+00 | 0.00E+00 |
| | E12u | 0.00E+00 | 0.00E+00 | 0.00E+00 | 0.00E+00 | 0.00E+00 | 0.00E+00 | 0.00E+00 | 0.00E+00 |
| | E14u | 0.00E+00 | 0.00E+00 | 0.00E+00 | 0.00E+00 | 0.00E+00 | 0.00E+00 | 0.00E+00 | 0.00E+00 |
| | E16u | 0.00E+00 | 0.00E+00 | 0.00E+00 | 0.00E+00 | 0.00E+00 | 0.00E+00 | 0.00E+00 | 0.00E+00 |

TABLE 17-continued

Aspheric Surfaces of Second Optical System

|  |  | Coupling lens | | Separation element | | Imaging element 621 | | Imaging element 622 | |
|---|---|---|---|---|---|---|---|---|---|
|  |  | Incidence surface | Exit surface | Incidence surface | Exit surface | Incidence surface | Exit surface | Incidence surface | Exit surface |
| Lower | rl | 0.00E+00 | −1.11E+01 | 0.00E+00 | −7.01E+00 | 1.00E+03 | 7.94E+01 | 1.71E+03 | −7.53E+00 |
|  | E2l | 0.00E+00 | 2.00E−04 | 0.00E+00 | 0.00E+00 | 0.00E+00 | 4.01E−04 | −3.37E+06 | 1.82E−03 |
|  | E4l | 0.00E+00 | 0.00E+00 | 0.00E+00 | 0.00E+00 | 0.00E+00 | −1.33E−06 | 9.79E+02 | −1.71E−06 |
|  | E6l | 0.00E+00 | 0.00E+00 | 0.00E+00 | 0.00E+00 | 0.00E+00 | 1.88E−09 | 0.00E+00 | 1.13E−09 |
|  | E8l | 0.00E+00 | 0.00E+00 | 0.00E+00 | 0.00E+00 | 0.00E+00 | −1.23E−12 | 0.00E+00 | −4.03E−13 |
|  | E10l | 0.00E+00 | 0.00E+00 | 0.00E+00 | 0.00E+00 | 0.00E+00 | 0.00E+00 | 0.00E+00 | 0.00E+00 |
|  | E12l | 0.00E+00 | 0.00E+00 | 0.00E+00 | 0.00E+00 | 0.00E+00 | 0.00E+00 | 0.00E+00 | 0.00E+00 |
|  | E14l | 0.00E+00 | 0.00E+00 | 0.00E+00 | 0.00E+00 | 0.00E+00 | 0.00E+00 | 0.00E+00 | 0.00E+00 |
|  | E16l | 0.00E+00 | 0.00E+00 | 0.00E+00 | 0.00E+00 | 0.00E+00 | 0.00E+00 | 0.00E+00 | 0.00E+00 |
| Odd number term | E1 | 0.00E+00 | 0.00E+00 | 0.00E+00 | 0.00E+00 | 0.00E+00 | −6.57E−03 | −9.25E+06 | −2.26E−02 |
| Tilt term | m0_1u | 0.00E+00 | 0.00E+00 | 0.00E+00 | 0.00E+00 | 0.00E+00 | 0.00E+00 | 4.03E−02 | −1.07E−02 |
|  | m0_1l | 0.00E+00 | 0.00E+00 | 0.00E+00 | 0.00E+00 | 0.00E+00 | 0.00E+00 | 4.03E−02 | −1.07E−02 |
|  | m2_1u | 0.00E+00 | 0.00E+00 | 0.00E+00 | 0.00E+00 | 0.00E+00 | 0.00E+00 | 5.46E−05 | 2.13E−05 |
|  | m2_2l | 0.00E+00 | 0.00E+00 | 0.00E+00 | 0.00E+00 | 0.00E+00 | 0.00E+00 | 5.46E−05 | 2.13E−05 |
|  | m4_1u | 0.00E+00 | 0.00E+00 | 0.00E+00 | 0.00E+00 | 0.00E+00 | 0.00E+00 | −1.49E−08 | 4.73E−10 |
|  | m4_1l | 0.00E+00 | 0.00E+00 | 0.00E+00 | 0.00E+00 | 0.00E+00 | 0.00E+00 | −1.49E−08 | 4.73E−10 |
|  | m0_4u | 0.00E+00 | 0.00E+00 | 0.00E+00 | 0.00E+00 | 0.00E+00 | 0.00E+00 | 1.39E−03 | 1.91E−03 |
|  | m0_4l | 0.00E+00 | 0.00E+00 | 0.00E+00 | 0.00E+00 | 0.00E+00 | 0.00E+00 | 1.39E−03 | 1.91E−03 |
|  | m1_l | 0.00E+00 | 0.00E+00 | 0.00E+00 | 0.00E+00 | 0.00E+00 | 0.00E+00 | 5.10E−04 | −1.31E−03 |

TABLE 18

Specifications of Third Optical System: Third Beam

|  |  | Value |
|---|---|---|
| Diaphragm: width [mm] of oval aperture | Main scanning | 1.200 |
|  | Sub-scanning | 1.720 |
| Outside scanning viewing angle [°] | | 108.0 |
| Inside scanning viewing angle [°] | | 186.45 |
| Outside printing area Ye [mm] | | 100.0 |
| Inside printing area Yc [mm] | | 8.296 |
| Angle α3 [°] between first beam and x-axis | | 72.8 |
| Lx mm | | −0.487 |

Arrangement of Third Optical System: Third Beam

|  |  | Origin of each plane | | | Direction of optical axis (in direction cosine) | | |
|---|---|---|---|---|---|---|---|
| [mm] | | x-coordinate | y-coordinate | z-coordinate | x-component | y-component | z-component |
| Light source | | 0.000 | 40.461 | 0.220 | 0.000 | 1.000 | 0.000 |
| Coupling lens | Incidence surface | 0.000 | 22.461 | 0.220 | 0.000 | 1.000 | 0.000 |
|  | Exit surface | 0.000 | 20.461 | 0.220 | 0.000 | 1.000 | 0.000 |
| Diaphragm | | 2.000 | 18.461 | 0.220 | 0.000 | 1.000 | 0.000 |
| Separation element | Incidence surface | 2.000 | 16.461 | 0.220 | 0.544 | 0.838 | 0.048 |
|  | Exit surface | 1.409 | 14.551 | 0.168 | 0.296 | 0.955 | 0.026 |
| Deflector | | −4.196 | 5.691 | 0.000 | −0.593 | 0.805 | 0.000 |
| Imaging element 631 | Incidence surface | −10.487 | 8.126 | 0.000 | −1.000 | 0.000 | 0.000 |
|  | Exit surface | −17.387 | 8.426 | 0.000 | −1.000 | 0.000 | 0.000 |
| Imaging element 632 | Incidence surface | −20.587 | 8.426 | −0.450 | −1.000 | 0.000 | 0.000 |
|  | Exit surface | −24.087 | 8.426 | −0.450 | −1.000 | 0.000 | 0.000 |

TABLE 18-continued

| | | | | | | |
|---|---|---|---|---|---|---|
| Scanned surface | −90.087 | 8.426 | −0.450 | −1.000 | 0.000 | 0.000 |

TABLE 19

Specifications Of Fourth Optical System

| | | Value |
|---|---|---|
| Diaphragm: width [mm] of oval aperture | Main scanning | 1.060 |
| | Sub-scanning | 0.320 |
| Outside scanning viewing angle [°] | | 252.0 |
| Inside scanning viewing angle [°] | | 173.45 |
| Outside printing area Ye [mm] | | 100.0 |
| Inside printing area Yc [mm] | | 8.296 |
| Angle α4 [°] between first beam and x-axis | | −72.8 |
| Lx [mm] | | −0.487 |

Arrangement of Fourth Optical System

| [mm] | | Origin of each plane | | | Direction of optical axis (in direction cosine) | | |
|---|---|---|---|---|---|---|---|
| | | x-coordinate | y-coordinate | z-coordinate | x-component | y-component | z-component |
| Light source | | 0.000 | −40.461 | 0.220 | 0.000 | −1.000 | 0.000 |
| Coupling lens | Incidence surface | 0.000 | −22.161 | 0.220 | 0.000 | −1.000 | 0.000 |
| | Exit surface | 0.000 | −20.461 | 0.220 | 2.000 | −1.000 | 0.000 |
| Diaphragm | | 2.000 | −18.461 | 0.220 | 0.000 | −1.000 | 0.000 |
| Separation element | Incidence surface | 2.000 | −16.461 | 0.220 | 0.544 | −0.838 | 0.048 |
| | Exit surface | 1.409 | −14.551 | 0.168 | 0.296 | −0.955 | 0.026 |
| Deflector | | −4.196 | −5.691 | 0.000 | −0.593 | −0.805 | 0.000 |
| Imaging element 641 | Incidence surface | −10.487 | −8.426 | 0.000 | −1.000 | 0.000 | 0.000 |
| | Exit surface | −17.387 | −8.426 | 0.000 | −1.000 | 0.000 | 0.000 |
| Imaging element 642 | Incidence surface | −20.587 | −8.426 | −0.450 | −1.000 | 0.000 | 0.000 |
| | Exit surface | −24.087 | −8.426 | −0.450 | −1.000 | 0.000 | 0.000 |
| Scanned surface | | −90.087 | −8.426 | −0.450 | −1.000 | 0.000 | 0.000 |

The shapes of the optical surfaces of the first optical system and the shapes of the optical surfaces of the third optical system are rotationally symmetrical to each other with respect to the y-axis. That is, if a coordinate system rotationally symmetrical to the local coordinate system XYZ of the first optical system with respect to the y-axis is set as a local coordinate system of the third optical system, the values of the aspheric coefficients of the third optical system are the same as those of the first optical system. Similarly, the shapes of the optical surfaces of the second optical system and the shapes of the optical surfaces of the fourth optical system are rotationally symmetrical to each other with respect to the Y-axis. That is, a coordinate system rotationally symmetrical to the local coordinate system XYZ of the second optical system with respect to the y-axis is set as a local coordinate system of the fourth optical system, the values of the aspheric coefficients of the fourth optical system are the same as those of the second optical system.

In the present exemplary embodiment, a beam emitted from the first light source 11 is converted into a parallel beam by the first coupling lens 21 and then divided into first and third beams by the first diaphragm in which two apertures are provided. Then, the first and third beams are incident on the first separation element 43. As illustrated in FIG. 10, the first separation element 43 includes optical elements 431 and 433, which deflect the first and third beams, respectively, in the main scanning cross section. The optical elements 431 and 433 make the first and third beams, respectively, incident on the deflector 5 at incident angles different from each other.

On the other hand, a beam emitted from the second light source 12 is converted into a parallel beam by the second coupling lens 22 and then divided into second and fourth beams by the second diaphragm in which two apertures are provided. Then, the second and fourth beams are incident on the second separation element 44. The second separation element 44 includes optical elements 442 and 444, which deflect the second and fourth beams, respectively, in the main scanning cross section. The optical elements 442 and 444 make the second and fourth beams, respectively, incident on the deflector 5 at incident angles different from each other.

In each of the first and second diaphragms, the positions in the z-direction of the two apertures are different from each other. Then, each of the first and second separation elements 43 and 44 is a sub-scanning oblique incidence system for making two beams incident on the deflector 5 from different sides with respect to an xy plane including deflection points. Further, the exit surfaces of the first and second separation elements 43 and 44 are cylindrical surfaces having refractive power in the sub-scanning cross section and collect beams in the sub-scanning cross section, thereby forming line images near deflection surfaces of the deflector 5.

As illustrated in FIG. 9, the first and third beams are incident on the deflector 5 from the positive side in the Y-axis direction with respect to the reference plane 9, and the second and fourth beams are incident on the deflector 5 from the negative side in the y-axis direction with respect to the reference plane 9. That is, the first and second beams for scanning a first scanned surface 701 are incident on the deflector 5 from different directions from each other with respect to the reference plane 9, and the third and fourth beams for scanning a second scanned surface 702 are incident on the deflector 5 from different directions from each other with respect to the reference plane 9.

The first and second beams are deflected by the deflector 5 and then incident on the first and second imaging optical systems 61 and 62, respectively, which are placed on different sides from each other with respect to the reference plane 9. The first imaging optical system 61 includes two imaging elements 611 and 612 and guides the first beam to the first area 71 (710 to 712) on the first scanned surface 701. The second imaging optical system 62 includes two imaging elements 621 and 622 and guides the second beam to the second area 72 (712 to 714) on the first scanned surface 701.

Further, the third and fourth beams are deflected by the deflector 5 and then incident on the third and fourth imaging optical systems 63 and 64, respectively, which are placed on different sides from each other with respect to the reference plane 9. The third imaging optical system 63 includes two imaging elements 631 and 632 and guides the third beam to the seventh area 73 (720 to 722) on the second scanned surface 702. The fourth imaging optical system 64 includes two imaging elements 641 and 642 and guides the fourth beam to the eighth area 74 (722 to 724) on the second scanned surface 702.

As described above, the optical scanning device 130 according to the present exemplary embodiment employs a configuration in which a single deflector deflects a plurality of beams emitted from light sources, and two scanned surfaces are scanned at different timings from each other. Consequently, it is possible to downsize the entire apparatus while reducing an increase in the number of components. Further, the optical scanning device 130 employs a cascade scanning method in which first and second beams scan printing areas different from each other on a first scanned surface, and third and fourth beams scan printing areas different from each other on a second scanned surface. Consequently, it is possible to shorten the optical path length from the deflector 5 to each scanned surface.

Then, in the optical scanning device 130, in each of the first, second, seventh and eighth areas 71, 72, 73, and 74, the width of a printing area on the side of the reference plane 9 with respect to the optical axis is set to be smaller than the width of a printing area on the side distant from the reference plane 9. Based on this configuration, it is possible to reduce the shifts in the incident positions of beams at the boundary between printing areas caused by a positional shift in each scanned surface.

In the present exemplary embodiment, each pair of the imaging elements 611 and 621, the imaging elements 631 and 641, the imaging elements 612 and 622, and the imaging elements 632 and 642 is a compound element obtained by integrating the imaging elements. Further, a plurality of beams share the first and second diaphragms, the first and second coupling lenses 21 and 22, and the first and second separation elements 43 and 44. Based on this configuration, it is possible to reduce the number of components as compared with a conventional configuration and achieve the further downsizing and simplification of the entire apparatus.

In the present exemplary embodiment, as illustrated in FIG. 10, the first and third beams emitted from the first light source 11 are incident on a common deflection surface of the deflector 5 at incident angles different from each other. Specifically, the angle between the first beam incident on the deflector 5 and the x-axis is $\alpha 1 = 107.2$ degrees, and the angle between the third beam incident on the deflector 5 and the x-axis is $\alpha 3 = 72.8$ degrees. Thus, the first and third beams are deflected with a phase difference of 34.4 degrees. Thus, when the first beam scans the first scanned surface 701, there is a possibility that the third beam is incident on the first imaging optical system 61 and becomes a ghost beam at a certain timing.

In the present exemplary embodiment, as described above, a configuration is employed in which the first and third beams are incident on the deflector 5 from different sides from each other with respect to the xy plane including deflection points. Consequently, a light blocking member is provided between the deflector 5 and the first scanned surface 701, whereby it is possible to block the third beam to become a ghost beam. Similarly, also in a case where another beam can become a ghost beam, a light blocking member may be provided on each optical path. Instead of providing a light blocking member, the scanning viewing angle of each beam and the incident angle of each beam on the deflector 5 may be appropriately set to prevent the occurrence of a ghost beam.

[Image Forming Apparatus]

Figure 11:
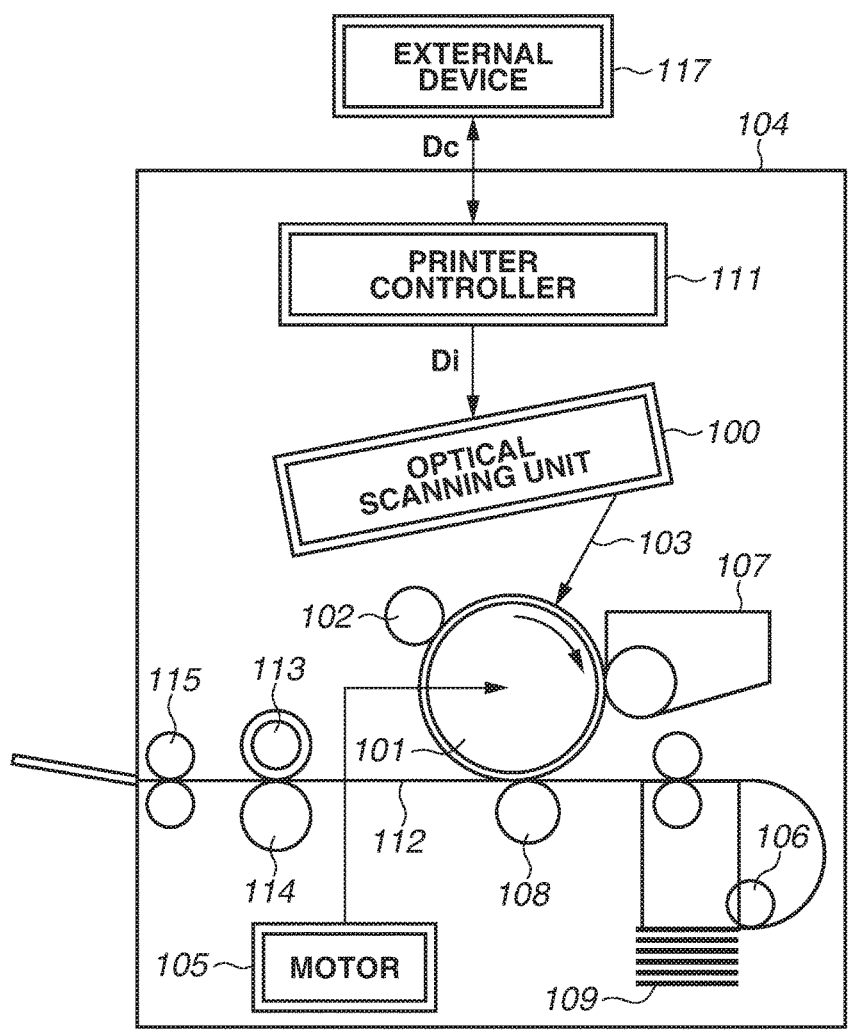
FIG. 11 is a schematic diagram of a main part of an image forming apparatus according to an exemplary embodiment of the present invention.

FIG. 11 is a schematic diagram of a main part (a sub-scanning cross-sectional view) of an image forming apparatus 104 according to an exemplary embodiment of the present invention. The image forming apparatus 104 includes the optical scanning device (optical scanning unit) 100 according to the above exemplary embodiments.

As illustrated in FIG. 11, code data Dc, which is output from an external device 117, such as a personal computer, is input to the image forming apparatus 104. The code data Dc is converted into image data (dot data) Di by a printer controller 111 in the apparatus, and the image data Di is input to the optical scanning unit 100. Then, a beam 103, which is modulated according to the image signal Di, is emitted from the optical scanning unit 100 and scans a photosensitive surface (a scanned surface) of a photosensitive drum 101 in the main scanning direction. Not only does the printer controller 111 convert data, the printer controller 111 also controls components, such as a motor 105, in the image forming apparatus 104.

The photosensitive drum 101 as an electrostatic latent image bearing member (a photosensitive member) is rotated clockwise by the motor 105. Then, according to this rotation, the photosensitive surface of the photosensitive drum 101 moves relative to the beam 103 in the sub-scanning direction. Above the photosensitive drum 101, a charging roller 102, which uniformly charges the photosensitive surface, is provided to come into contact with the photosensitive surface. Then, the photosensitive drum 101 is configured such that the beam 103 from the optical scanning unit 100 is emitted onto the photosensitive surface charged by the charging roller 102.

As described above, the beam 103 is modulated based on the image signal Di, and then the beam 103 is emitted. An electrostatic latent image is thus formed on the photosensitive surface. The electrostatic latent image is developed as a toner image by a developing device 107, which is disposed to come into contact with the photosensitive surface further downstream in the rotational direction of the photosensitive drum 101 than the emission position of the beam 103.

The toner image developed by the developing device 107 is transferred onto a sheet 112 as a transfer target material by a transfer roller (transfer device) 108, which is disposed below the photosensitive drum 101 to be opposed to the photosensitive drum 101. The sheet 112 is stored in a sheet cassette 109, which is anterior to (to the right of, in FIG. 11) the photosensitive drum 101, but can also be manually fed. In an end portion of the sheet cassette 109, a sheet feeding roller 106 is disposed and feeds the sheet 112 in the sheet, cassette 109 to a conveying path.

The sheet 112 onto which the unfixed toner image has been transferred is further conveyed to a fixing device posterior to (to the left of, in FIG. 11) the photosensitive drum 101. The fixing device includes a fixing roller 113, which includes a fixing heater (not illustrated) there within, and a pressure roller 114, which is disposed to come into pressure contact with the fixing roller 113. In a pressure contact portion between the fixing roller 113 and the pressure roller 114, the fixing device simultaneously pressurizes and heats the sheet 112 conveyed from the transfer roller 108. The unfixed toner image is thus fixed on the sheet 112. Further, sheet discharge rollers 115 are disposed posterior to the fixing roller 113, and the sheet 112 to which the toner image has been fixed is discharged to outside the image forming apparatus 104.

Alternatively, the image forming apparatus 104 may be configured as a color image forming apparatus by providing a plurality of optical scanning units 100, a plurality of photosensitive drums 101, and a plurality of developing devices 107. For example, four optical scanning devices according to the first or second exemplary embodiment are provided, or two optical scanning devices according to the third exemplary embodiment are provided, whereby it is possible to achieve a color image forming apparatus for recording image information on four photosensitive drums in parallel. Further, for example, a color digital copying machine may be configured by connecting a color image reading device including a line sensor, such as a charge-coupled device (CCD) sensor or a complementary metal-oxide-semiconductor (CMOS) sensor, as the external device 117 to the image forming apparatus 104.

[Variations]

While exemplary embodiments of the present invention have been described, the present invention is not limited to the exemplary embodiments, and the exemplary embodiments can be combined, modified, and changed in various manners within the scope of the present invention.

For example, the number of imaging elements included in each imaging optical system is not limited to that in the above exemplary embodiments, and can be appropriately selected. Further, in the exemplary embodiments, the description has been given on the assumption that the light source is a single-beam laser having only a single light emission point. Alternatively, a monolithic multi-beam laser having a plurality of light emission points may be employed as the light source. In the exemplary embodiments, for ease of description, the description of a synchronous detection system for synchronously detecting the light emission timing of the light source is omitted. However, a known synchronous detection system may be provided to control the light emission timing of the light source.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-163393, filed Aug. 24, 2016, and No. 2016-239809, filed Dec. 9, 2016, which are hereby incorporated by reference herein in their entirety.

What is claimed is:

1. An optical scanning device comprising:
   a deflector configured to deflect first and second beams to scan an effective area of a first scanned surface in a main scanning direction; and
   first and second imaging optical systems configured to guide the first and second beams deflected by the deflector to first and second areas which are included in the effective area and different from each other in the main scanning direction,
   wherein, of the first area, a side distant from the second area with respect to a first optical axis of the first imaging optical system is defined as a first subregion, and a side close to the second area with respect to the first optical axis is defined as a second subregion, and a width of the first subregion is longer than a width of the second subregion in the main scanning direction,
   wherein, of the second area, a side distant from the first area with respect to a second optical axis of the second imaging optical system is defined as a third subregion, and a side close to the first area with respect to the second optical axis is defined as a fourth subregion, and a width of the third subregion is longer than a width of the fourth subregion in the main scanning direction, and
   wherein in a main scanning cross section, when a radius of a circumcircle of the deflector is Rd [mm], and a width of each of the second and fourth subregions is Yc [mm], and a width of each of the first and third subregions is Ye [mm], the condition that $Yc<Rd<Ye$ is satisfied.

2. The optical scanning device according to claim 1, wherein the first and second beams are incident on the deflector from different sides from each other with respect to a reference plane including a rotational axis of the deflector and perpendicular to the main scanning direction.

3. The optical scanning device according to claim 2, wherein in the effective area, the first area is an area on a side where the first beam is incident on the deflector with respect to the reference plane, and the second area is an area on a side where the second beam is incident on the deflector with respect to the reference plane.

4. The optical scanning device according to claim 1, wherein a scanning angle corresponding to the second subregion is smaller than a scanning angle corresponding to the first subregion, and a scanning angle corresponding to the fourth subregion is smaller than a scanning angle corresponding to the third subregion.

5. The optical scanning device according to claim 1, further comprising a separation element configured to separate the first and second beams emitted from a common light source from each other.

6. The optical scanning device according to claim 5, further comprising:
a reflection element,
wherein the first beam is deflected by the separation element and is guided to the deflector, and
wherein the second beam is reflected on the reflection element not through the separation element and is guided to the deflector.

7. The optical scanning device according to claim 1, wherein a scanning speed of the first beam is different between an on-axis image height and an off-axis image height in the first area, and a scanning speed of the second beam is different between an on-axis image height and an off-axis image height in the second area.

8. The optical scanning device according to claim 1, further comprising:
a separation element configured to separate the first and second beams emitted from a common light source from each other, and
wherein the first and second beams are incident on deflection surfaces different from each other in the deflector, and
wherein the deflector scans the first and second areas at different timings from each other.

9. The optical scanning device according to claim 8, wherein the first and second beams projected onto a plane perpendicular to a rotational axis of the deflector are incident on the deflector from directions symmetrical to each other with respect to a reference plane including the rotational axis and perpendicular to the main scanning direction.

10. The optical scanning device according to claim 9, wherein the following conditions are satisfied:

$$\alpha 1 > (\rho 1 - \omega 0) \times 2 - \omega 1_{min},$$

$$\alpha 1 < (\rho 1 + \omega 0) \times 2 - \omega 1_{max},$$

$$\alpha 1 > \omega 1_{max},$$

$$\alpha 1 > -2 \times (\rho 1 + \omega 0) + 2 \times 360°/N \times (J-1) - \omega 1_{min}, \text{ and}$$

$$\alpha 1 < -2 \times (\rho 1 - \omega 0) + 2 \times 360°/N \times (J-1) - \omega 1_{max},$$

where in the main scanning cross section, an angle between a principal ray of the first beam incident on the deflector and the reference plane is $\alpha 1$, an intersection of a circumcircle of the deflector and the principal ray is P1$i$, an angle between a straight line connecting the intersection P1$i$ and a center of the circumcircle and the reference plane is $\rho 1$, an angle between the principal ray incident on a most off-axis image height of a side of the first beam in the effective area and the reference plane is $\omega 1_{max}$, an angle between the principal ray incident on a center image height in the effective area and the reference plane is $\omega 1_{min}$, the number of deflection surfaces of the deflector is N, and an integer satisfying $\omega 0=180°/N$ and $2 \le J \le N$ is J.

11. The optical scanning device according to claim 9, wherein the following conditions are satisfied:

$$\alpha 1 < -\omega 1_{max} 360°/N \times (J-1),$$

where in the main scanning cross section, an angle between a principal ray of the first beam incident on the deflector and the reference plane is $\alpha 1$, an angle between the principal ray incident on a most off-axis image height of a side of the first beam in the effective area and the reference plane is $\omega 1_{max}$, the number of deflection surfaces of the deflector is N, and an integer satisfying $2 \le J \le N$ is J.

12. The optical scanning device according to claim 9, wherein the following conditions are satisfied:

$$\alpha 1 > (2 \times 360°/N \times J - \omega 1_{min})/3,$$

where in the main scanning cross section, an angle between a principal ray of the first beam incident on the deflector and the reference plane is $\alpha 1$, an angle between the principal ray incident on a most off-axis image height of a side of the first beam in the effective area and the reference plane is $\omega 1_{max}$, an angle between the principal ray incident on a center image height in the effective area and the reference plane is $\omega 1_{min}$, the number of deflection surfaces of the deflector is N, and an integer satisfying $2 \le J \le N$ is J.

13. The optical scanning device according to claim 8, further comprising a light blocking member configured to block the first beam proceeding to the second area and block the second beam proceeding to the first area.

14. An image forming apparatus comprising:
the optical scanning device according to claim 1;
a developing device configured to develop as a toner image an electrostatic latent image formed on the first scanned surface by the first and second beams from the first and second imaging optical systems;
a transfer device configured to transfer the developed toner image onto a transfer target material; and
a fixing device configured to fix the transferred toner image to the transfer target material.

15. An optical scanning device comprising:
a deflector configured to deflect first and second beams to scan an effective area of a first scanned surface in a main scanning direction; and
first and second imaging optical systems configured to guide the first and second beams deflected by the deflector to first and second areas which are included in the effective area and different from each other in the main scanning direction,
wherein, of the first area, a side distant from the second area with respect to a first optical axis of the first imaging optical system is defined as a first subregion, and a side close to the second area with respect to the first optical axis is defined as a second subregion, and a width of the first subregion is longer than a width of the second subregion in the main scanning direction,
wherein, of the second area, a side distant from the first area with respect to a second optical axis of the second imaging optical system is defined as a third subregion, and a side close to the first area with respect the second optical axis is defined as a fourth subregion, and a width of the third subregion is longer than a width of the fourth subregion in the main scanning direction, and
wherein when a radius of a circumcircle of the deflector in a main scanning cross section is Rd [mm], and a distance in an optical axis direction between an incident position of a principal ray of each of the first and second beams on the deflector and a rotational axis of the deflector is Lx [mm], the condition that $$-Rd/2 \le Lx \le Rd/2$$

is satisfied.

16. An optical scanning device comprising:

a deflector configured to deflect first and second beams to scan an effective area of a first scanned surface and deflect third and fourth beams to scan an effective area of a second scanned surface in a main scanning direction;

first and second imaging optical systems configured to guide the first and second beams deflected by the deflector to first and second areas which are included in the effective area of the first scanned surface and are different from each other in the main scanning direction; and third and fourth imaging optical systems configured to guide third and fourth beams deflected by the deflector to third and fourth areas which are included in the effective area of the second scanned surface and are different from each other in the main scanning direction, wherein, of the first area, a side distant from the second area with respect to a first optical axis of the first imaging optical system is defined as a first subregion, and a side close to the second area with respect to the first optical axis is defined as a second subregion, and a width of the first subregion is longer than a width of the second subregion in the main scanning direction, wherein, of the second area, a side distant from the first area with respect to a second optical axis of the second imaging optical system is defined as a third subregion, and a side close to the first area with respect the second optical axis is defined as a fourth subregion, and a width of the third subregion is longer than a width of the fourth subregion in the main scanning direction.

17. The optical scanning device according to claim 16, wherein, of the third area, a side distant from the fourth area with respect to a third optical axis of the third imaging optical system is defined as a fifth subregion, and a side close to the fourth area with respect to the third optical axis is defined as a sixth subregion, and a width of the fifth subregion is longer than a width of the sixth subregion in the main scanning direction, and, wherein, of the fourth area, a side distant from the third area with respect to a fourth optical axis of the fourth imaging optical system is defined as a seventh subregion, and a side close to the third area with respect the fourth optical axis is defined as an eighth subregion, and a width of the seventh subregion is longer than a width of the eighth subregion in the main scanning direction.

18. The optical scanning device according to claim 16, further comprising:

a first separation element configured to separate the first and third beams emitted from a first light source; and a second separation element configured to separate the second and fourth beams emitted from a second light source.

19. The optical scanning device according to claim 16, wherein in a sub-scanning cross section, the first and third beams are incident on the deflector from different sides from each other with respect to a plane perpendicular to a rotational axis of the deflector, and the second and fourth beams are incident on the deflector from different sides from each other with respect to the plane.

* * * * *